(12) United States Patent
Chang et al.

(10) Patent No.: US 11,230,044 B2
(45) Date of Patent: Jan. 25, 2022

(54) METHOD OF SETTING PRESSURE PROFILE OF INJECTION-MOLDING APPARATUS

(71) Applicant: CORETECH SYSTEM CO., LTD., Zhubei (TW)

(72) Inventors: Rong-Yeu Chang, Zhubei (TW); Yuing Chang, Zhubei (TW); Chia-Hsiang Hsu, Zhubei (TW); Ting-Yu Cheng, Zhubei (TW)

(73) Assignee: CORETECH SYSTEM CO., LTD., Zhubei (TW)

( * ) Notice: Subject to any disclaimer, the term of this patent is extended or adjusted under 35 U.S.C. 154(b) by 0 days.

(21) Appl. No.: 17/115,453

(22) Filed: Dec. 8, 2020

(65) Prior Publication Data

US 2021/0260804 A1    Aug. 26, 2021

Related U.S. Application Data

(60) Provisional application No. 62/979,777, filed on Feb. 21, 2020.

(51) Int. Cl.
| | |
|---|---|
| *B29C 45/77* | (2006.01) |
| *G06F 30/20* | (2020.01) |
| *B29C 45/76* | (2006.01) |
| *G06F 11/00* | (2006.01) |
| *G06F 113/22* | (2020.01) |

(52) U.S. Cl.
CPC .............. *B29C 45/77* (2013.01); *G06F 30/20* (2020.01); *B29C 2945/7601* (2013.01); *B29C 2945/76381* (2013.01); *B29C 2945/76434* (2013.01); *G06F 2113/22* (2020.01)

(58) Field of Classification Search
None
See application file for complete search history.

(56) References Cited

U.S. PATENT DOCUMENTS

| | | | |
|---|---|---|---|
| 9,409,335 B1* | 8/2016 | Su ............................ G06F 30/20 |
| 9,555,571 B1* | 1/2017 | Chang ................... G05B 19/401 |
| 9,573,307 B1* | 2/2017 | Tseng .................. B29C 45/0005 |
| 2008/0184114 A1* | 7/2008 | Hano ................ G05B 19/41865 715/700 |
| 2014/0200710 A1* | 7/2014 | Chang ..................... G06F 30/23 700/197 |
| 2019/0152114 A1* | 5/2019 | Chang ..................... G06F 30/23 |

* cited by examiner

*Primary Examiner* — Alison L Hindenlang
*Assistant Examiner* — Andrés E. Behrens, Jr.
(74) *Attorney, Agent, or Firm* — Muncy, Geissler, Olds and Lowe, P.C.

(57) ABSTRACT

The present disclosure provides a method of producing a molded product. The method comprises steps of performing, via computer-assisted engineering simulation software, a first simulation process to generate a plurality of molding conditions comprising a default injection velocity profile and a default packing pressure profile; conducting, via an injection-molding apparatus, a trial molding to inject a molding material into a mold using the default molding conditions and sensing a plurality of in-mold pressures at different sites in a mold cavity of the mold; and conducting, via an injection-molding apparatus, an actual molding to produce the molded product using the default molding conditions if a deviation of the in-mold pressures at an endpoint of a packing stage is less than a target value.

14 Claims, 26 Drawing Sheets

| | |
|---|---|
| Polymer | High impact polystyrene(HIPS) |
| Grade Name | POLYREX PH-60 |
| Producer | CHI-MEI |
| Comment | MFI(200.5)=5.5g/10min, D=1.05g/cc |
| Last modified date | - |
| Moldex3D Bank Version | 2020.1.5 |
| Process condition | |
| Melt temperature (minimum) | 170°C |
| Melt temperature (normal) | 190°C |
| Melt temperature (maximum) | 210°C |
| Mold temperature (minimum) | 40°C |
| Mold temperature (normal) | 55°C |
| Mold temperature (minimum) | 70°C |
| Ejection temperature | 99°C |
| Freeze temperature | 119°C |

FIG. 6

| Filling Condition | | Packing Condition | |
|---|---|---|---|
| Velocity (mm/s) | 5, 10, 20, 30, 40, 50, 60, 70, 80 | Velocity (mm/s) | 40 |
| Pressure (bar) | Machine max. | Pressure (bar) | 960-480-240 |
| Position (mm) | 16 | time (sec) | 7-0.5-0.5 |

FIG. 7

| Filling Condition | | Packing Condition | |
|---|---|---|---|
| Velocity (mm/s) | 40 | Velocity (mm/s) | 40 |
| Pressure (bar) | Machine max. | Pressure (bar) | 100-900 |
| Position (mm) | 16 | time (sec) | 6-9, 8-7, 10-5 |

FIG. 10

METHOD OF SETTING PRESSURE PROFILE OF INJECTION-MOLDING APPARATUS

PRIORITY CLAIM AND CROSS-REFERENCE

This application claims the priority benefit of US provisional application Ser. No. 62/979,777, filed on Feb. 21, 2020. The entirety of the above-mentioned patent application is hereby incorporated by reference herein and made a part of this specification.

TECHNICAL FIELD

The present disclosure relates to an injection molding method, and more particularly, to a method of producing a molded product and a method of adjusting a dimension of a molded product.

DISCUSSION OF THE BACKGROUND

In general, the setting of molding conditions in an injection-molding apparatus requires a large number of trial molding operations and a lengthy setup time. Specifically, in a trial run of an injection-molding process, on-site technicians must continuously monitor the actual injection-molding machine and determine an optimal molded product through measuring or examining dimensions, weight and warpage of molded products obtained in the trial run. The molding conditions of the optimal molded product are adapted as a standard state. In other words, the molding conditions of the optimal molded product are implemented by repetitive trial and error, which requires much time and labor.

This Discussion of the Background section is provided for background information only. The statements in this Discussion of the Background are not an admission that the subject matter disclosed in this Discussion of the Background section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a method of producing a molded product. The method includes steps of performing, via computer-assisted engineering simulation software, a first simulation process to generate a plurality of molding conditions comprising a default injection velocity profile and a default packing pressure profile; conducting, via an injection-molding apparatus, a trial molding to inject a molding material into a mold using the molding conditions and sensing a plurality of in-mold pressures at different sites in a mold cavity of the mold; and conducting, via the injection-molding apparatus, an actual molding to produce the molded product using the molding conditions if a deviation of the in-mold pressures at an endpoint of a packing stage is less than a target value.

In some embodiments, the performing of the first simulation process to generate the default molding conditions includes steps of specifying a simulation domain comprising a model; performing a first virtual molding to determine a velocity-to-pressure transfer point; performing a plurality of second virtual moldings using varying injection velocities and a default start filling point derived from the velocity-to-pressure transfer point to determine a default injection velocity; performing a plurality of third virtual moldings using the default injection velocity, the default start filling point and varying packing times to determine a period of a packing stage; specifying an initial packing pressure profile for use during the packing stage by limiting a maximum injection pressure and thereby defining the default injection velocity profile; performing a fourth virtual molding using the default injection velocity profile, the default start filling point, the period of the packing stage, and the initial packing pressure profile and obtaining pressures at different sensing nodes of the model; and determining the default packing pressure profile based on the initial packing pressure profile and a deviation of the pressures obtained at the endpoint of the packing stage.

In some embodiments, the first virtual molding is simulated to obtain a volume of the model, and the velocity-to-pressure transfer point occurs when the model is approximately full.

In some embodiments, the default injection velocity is selected from peak pressures generated from the second virtual moldings.

In some embodiments, during the simulation of the third virtual moldings, pressures at different sites of the model are obtained, and the period of the packing stage is determined based on the pressures obtained near a gate node of the model, wherein the gate node of the model in the simulation domain corresponds to a gate inside a mold of the injection-molding apparatus.

In some embodiments, the period of the packing stage is determined based on the pressures obtained at one of the sensing nodes on a plate connected to a columnar segment where the gate node is positioned, and the plate corresponds to a molding cavity inside the mold.

In some embodiments, the determining of the default packing pressure profile includes steps of determining whether the deviation of the pressures obtained at the endpoint of the packing stage is less than the target value; and generating an adjusted packing pressure profile in accordance with the initial packing pressure profile.

In some embodiments, the initial packing pressure profile functions as the default packing pressure profile for conducting the trial molding and the actual molding if the deviation of the obtained pressures is less than the target value, and the adjusted packing pressure profile functions as the default packing pressure profile if the deviation of the obtained pressures is not less than the target value.

In some embodiments, the initial packing pressure profile comprises a constant pressure, and the adjusted packing pressure profile comprises varying pressures.

In some embodiments, the pressures in the adjusted packing pressure profile decrease as time elapses.

In some embodiments, the adjusted packing pressure profile is represented by a sloped waveform.

In some embodiments, the adjusted packing pressure profile is represented by a stepped waveform.

In some embodiments, a maximum of the adjusted packing pressure profile is equal to the constant pressure of the initial packing pressure profile.

In some embodiments, the method further includes steps of generating, via the injection-molding apparatus, at least one adjusted molding condition if the deviation of the in-mold pressures at the endpoint of the packing stage is not less than the target value; performing, via the computer-assisted engineering simulation software, a second simulation process to generate at least one simulated molding condition corresponding to the adjusted molding condition to ensure that the adjusted molding condition is qualified; and conducting, via the injection-molding apparatus, the actual molding to produce the molded product using the adjusted molding conditions if the adjusted molding condition is qualified.

In some embodiments, the method further includes a step of performing a fifth virtual molding to generate a plurality of simulated state waveforms if the deviation of the obtained pressures at the endpoint of the packing stage is less than the target value.

One aspect of the present disclosure provides a method of adjusting a dimension of a molded product. The method includes steps of generating a plurality of molding conditions; selecting one of the molding conditions to be updated for the adjusting of the dimension of the molded product; calculating an average of the in-mold pressures at the endpoint of the packing stage based on an adjusted dimension of the molded product; and updating the selected molding condition based on the average of the in-mold pressures at the endpoint of the packing stage.

In some embodiments, the dimension of the molded product is adjusted within a range defined by a controlling window using extrema of two molding conditions comprising the selected molding condition.

In some embodiments, the extrema are obtained by simulating a plurality of virtual molding iterations while keeping the deviation below the target value.

In some embodiments, the molding conditions are generated using a plurality of virtual moldings.

In some embodiments, the molding conditions are generated using a plurality of virtual moldings and at least one trial molding. The foregoing has outlined rather broadly the features and technical advantages of the present disclosure in order that the detailed description of the disclosure that follows may be better understood. Additional features and technical advantages of the disclosure are described hereinafter, and form the subject of the claims of the disclosure. It should be appreciated by those skilled in the art that the concepts and specific embodiments disclosed may be utilized as a basis for modifying or designing other structures, or processes, for carrying out the purposes of the present disclosure. It should also be realized by those skilled in the art that such equivalent constructions do not depart from the spirit or scope of the disclosure as set forth in the appended claims.

BRIEF DESCRIPTION OF THE DRAWINGS

A more complete understanding of the present disclosure may be derived by referring to the detailed description and claims. The disclosure should also be understood to be coupled to the figures' reference numbers, which refer to similar elements throughout the description.

FIG. 6 shows a data sheet of the molding material (high-impact polystyrene, HIPS) in accordance with some embodiments of the present disclosure.

FIG. 7 shows a data sheet including filling conditions and packing conditions for simulating second virtual moldings in accordance with some embodiments of the present disclosure.

FIG. 10 shows a data sheet including filling conditions and packing conditions for simulating third virtual moldings in accordance with some embodiments of the present disclosure.

DETAILED DESCRIPTION

Figure 1:
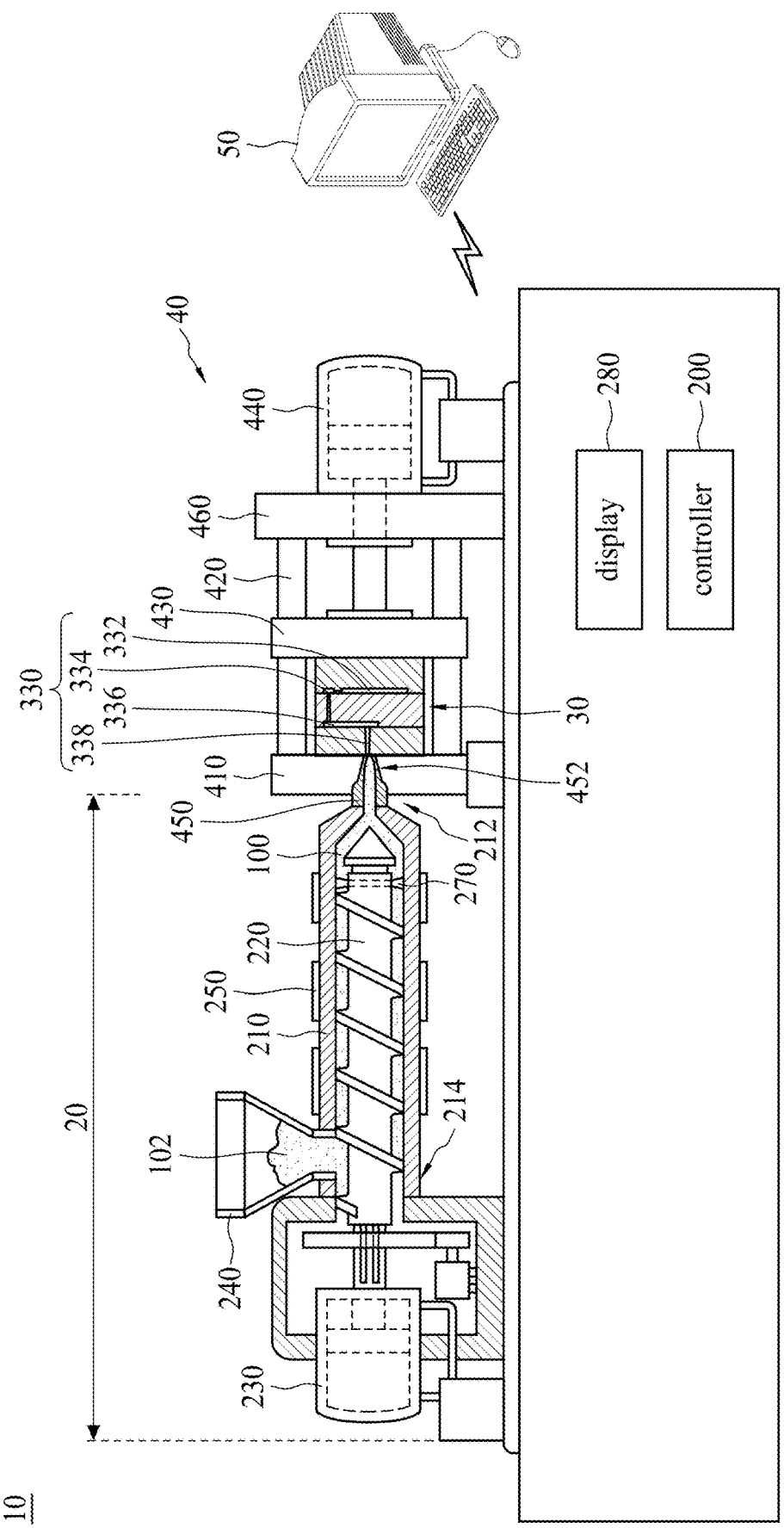
FIG. 1 is a schematic view of an injection-molding apparatus in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

Figure 2:
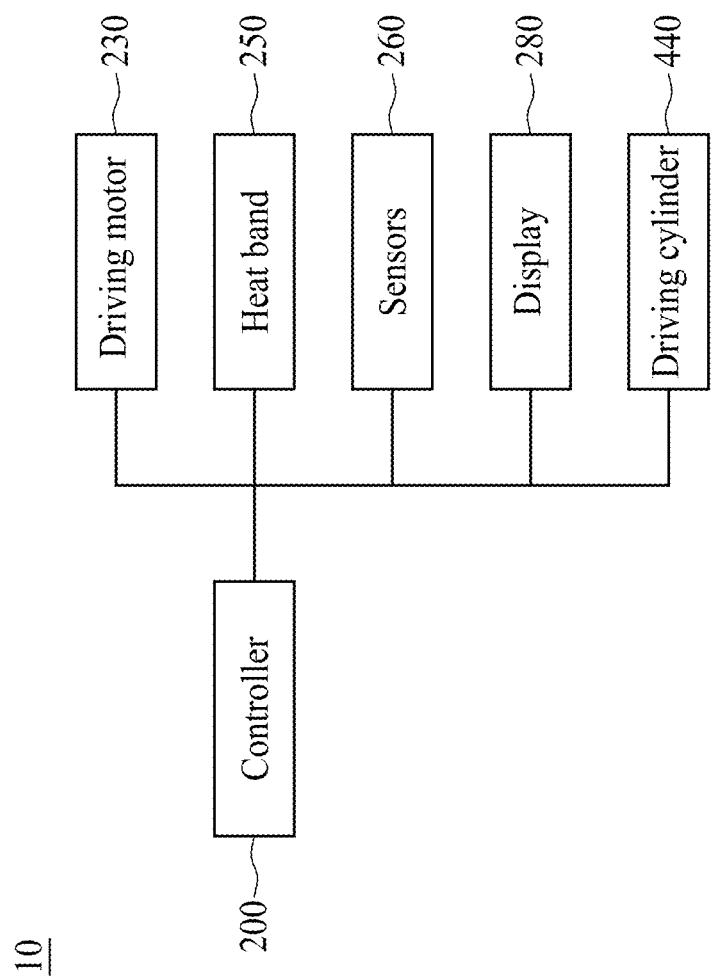
FIG. 2 is a circuit block diagram of an injection-molding apparatus in accordance with some embodiments of the present disclosure.

FIG. 1 is a schematic view of an injection-molding apparatus 10, in a genuine domain, in accordance with some embodiments of the present disclosure, and FIG. 2 is a circuit block diagram of the injection-molding apparatus 10 in accordance with some embodiments of the present disclosure. Referring to FIGS. 1 and 2, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 is a three-plate mold, i.e., the mold 30 includes three mold plates; a space part 330 in the mold 30 includes a mold cavity 332, a gate 334, a runner 336 and a sprue 338 in communication with each other.

The clamping assembly 40 is in operative connection with the mold 30 for clamping the mold plates. In some embodiments, the clamping assembly 40 includes a fixed plate 410, a plurality of tie bars 420 mounted on the fixed plate 410, and a moving plate 430 slidably engaged with the tie bars 420, wherein the moving plate 430 is guided by a driving cylinder 440. The mold plate proximal to the barrel 210 is secured on the fixed plate 410, and the mold plate distal to the barrel 210 is secured on the moving plate 430 in any suitable manner, wherein the driving cylinder 440, under the control of a controller 200, drives the moving plate 430 to open or close the mold 30.

In some embodiments, the downstream end 212 of the barrel 210 is adapted to engage an open nozzle 450. The open nozzle 450 includes a tip 452 adapted to engage the sprue 338 in the mold plate proximal to the barrel 210. The nozzle 450 is in communication with the sprue 338 as the mold plate proximal to the barrel 210, is assembled with the fixed plate 410. A molding material 100 under pressure is delivered to the sprue 338 from the tip 452 of the open nozzle 450 pressed tightly against the sprue 338 in order to deliver the molding material 100 to the space part 330 of the mold 30 during a filling stage.

The clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on the tie bar 420. In some embodiments, the driving cylinder 440 penetrates the ejector plate 460 and directly connects to the moving plate 430 to open or close the mold 30. After the mold plates are separated (i.e., the mold 30 is opened), a distance between the moving plate 430 and the ejector plate 460 is reduced, so the ejector pin can penetrate through the ejector plate 460 to push a molded product out of the mold 30.

Mounted for motion within the barrel 210 is a screw 220 operably connected to a driving motor 230, under control of the controller 200. The driving motor 230 may be disposed at an upstream end 214, opposite to the downstream end 212, of the barrel 210. The molding machine 20 processes material, such as plastic granules 102, by feeding the material through a hopper 240 to the barrel 210 in order to make the material soft and force the softened material (i.e., the molding material 100) into the space part 330 of the mold 30 by the use of the screw 220 driven by the driving motor 230, wherein the plastic granules 102 change phase from solid to liquid by at least one heat band 250 attached to the barrel 210. The heat band 250, under control of the controller 200, functions to heat the plastic granules 102 in the barrel 210 to a temperature at which the plastic granules 102 become flowable (i.e., soft and deformable). The heat band 250 may generate heat via electrical inductance or microwave or ultrasonic energy.

The controller 200 is configured to control the production of the molded product by the injection-molding apparatus 10. In detail, the controller 200 is employed to monitor the real-time conditions, including pressures and temperatures, using multiple sensors 260 disposed at different sensing sites of the mold 30, and placed in the barrel 210, to achieve a more consistent and reliable molded product. In some embodiments, the sensors 260 may be provided with a communications link directly to the controller 200. The controller 200 can incorporate the sensors 260 to monitor the position, speed and velocity of the screw 220.

In operation, information associated with conditions measured by the sensors 260 is transmitted to the controller 200, which executes real-time and/or post-molding analyses to predict quality of the molded product. In addition, the controller 200 is programmed to control operation of the driving motor 230, which in turn controls a reciprocal movement of the screw 220, to control operation of the heat band 250, which in turn controls the temperature of the molding material 100; and to control operation of the driving cylinder 440, which in turn controls a reciprocal movement of the moving plate 430 based on analyzed results. In some embodiments, the controller 200 is configured to control operating parameters including, but not limited to, injection time, injection pressure, packing pressure, packing time, molding temperature, and ejection temperature based on the analyzed results. In some embodiments, the controller 200 can be programmed to alert on-site technicians of machine malfunctions, such as when the pressure in the barrel 210 drops below a particular value relative to a preset pressure, or even shut down the molding machine 20.

In some embodiments, the molding machine 20 further includes a check valve 270 mounted on the screw 220; the check valve 270 is in tight contact with the barrel 210 during the filling stage, and the check valve 270 is open for allowing the molding material 100 to flow to the downstream end 212 of the barrel 210 during a packing stage subsequent to the filling stage. Typically, in the filling stage, the molding material 100 is injected into the space part 330 of the mold 30; in the packing stage, the molding material 100 is held in the space part 330 to replicate the texture and shape thereof, wherein the molding material 100 is packed in the space part 330 during solidification to avoid shrinkage in the mold 30. In some embodiments, the packing process continues until the space part 330 is filled with the molding material 100. In some embodiments, the screw 220 may rotate and move toward the upstream end 214 of the barrel 210 during the packing stage.

The molding machine 20 can further include a display 280 for displaying data related to the performance and operation of the molding machine 20 to the on-site technicians. The display 280 is further configured to accept input data from the on-site technicians. In other words, the display 280 is provided with a communications link directly to the controller 200 to provide real-time control functions of the molding machine 20 by the on-site technicians, particularly where the on-site technicians' intervention is required.

In some embodiments, the molding machine 20 can further include operation interface communication links among the controller 200, the driving motor 230, the heat band 250, the display 280, the driving cylinder 440 and other peripheral devices, and a program sequence of operation which renders the operation interface capable of monitoring diagnostic functions of the controller 200 and the molding machine 20, triggering sound/light alarms regarding conditions of the molding machine 20, receiving performance data from the molding machine 20, and receiving input data from the display 280.

The computer 50 is associated with the molding machine 20 and is configured to execute computer-assisted engineering (CAE) simulation software and to transmit at least one simulation result to the controller 200 through a connection such as a hardwired connection or a wireless coupling. In some embodiments, the computer 50 includes a standardized operation system capable of running general-purpose application software for assisting with the analysis of process performance data and for communicating with the controller 200 and the display 280 via communication ports thereof.

Figure 3:
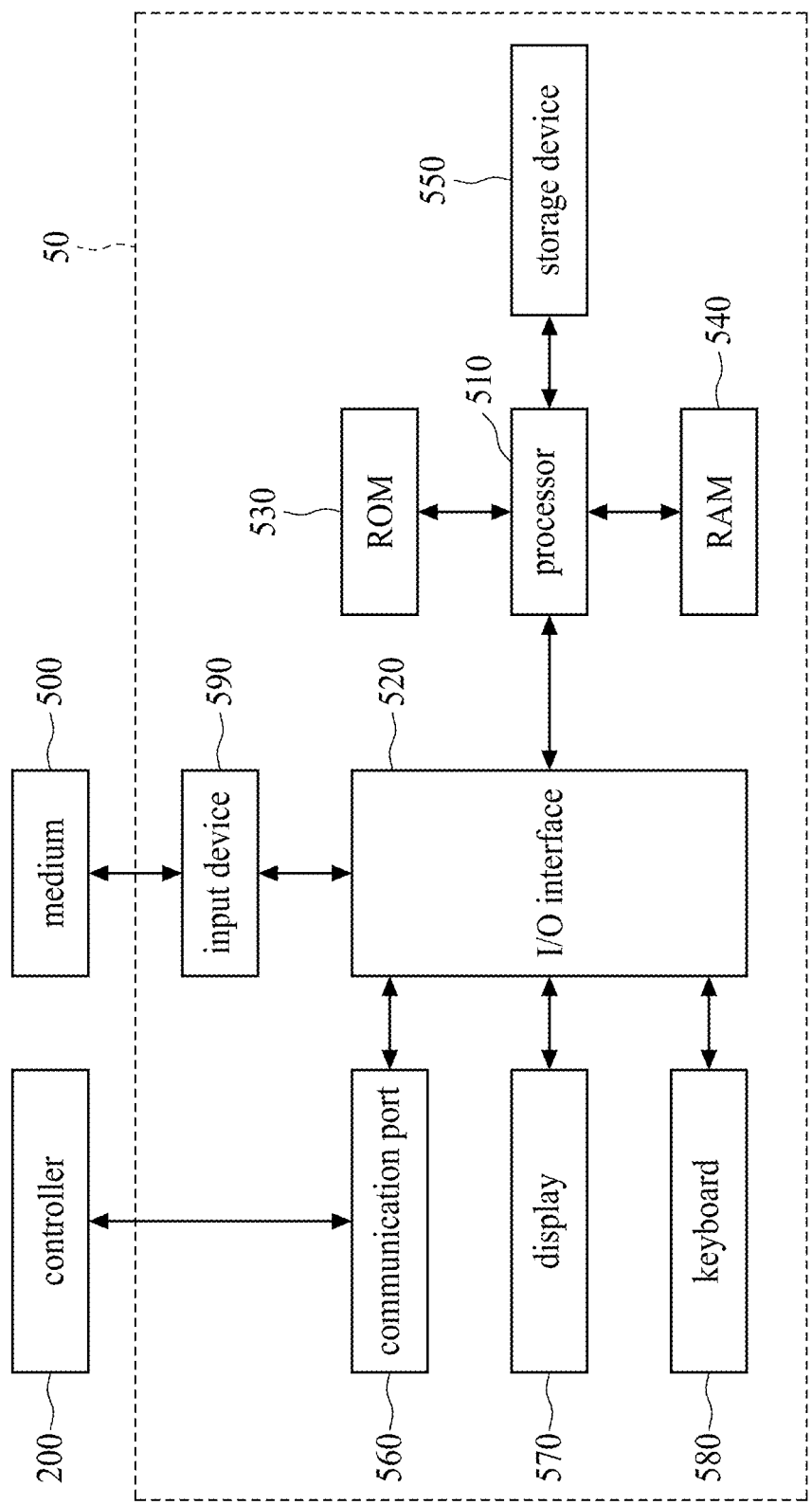
FIG. 3 is a functional block diagram of a computer in FIG. 1.

FIG. 3 is a functional block diagram of the computer 50 in FIG. 1. Referring to FIG. 3, the computer 50 includes a processor 510 adapted to perform a computer-implemented simulation method for use in injection molding, an input/output (I/O) interface 520 electrically coupled to the processor 510, and memories, which may include a read-only memory (ROM) 530, a random-access memory (RAM) 540 and a storage device 550. The ROM 530, the RAM 540 and the storage device 550 are communicatively coupled to the processor 510.

The computer 50 further includes a communication port 560 to support communications over wired networks or links. The computer 50 may further include one or more accompanying input/output devices including a display 570, a keyboard 580 and one or more other input devices 590. The input devices 590 and the communication port 560 support communications over wired networks or links. The display 570 refers to a portion of a screen used to display an output of the computer 50 to the on-site technicians. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processor 510 is configured to execute operations for performing a computer-implemented injection-molding simulation method according to the computer instructions. In some embodiments, the processor 510 reads software algorithms from the other input device 590 or the storage device 550, executes calculation steps, and stores a calculated result in the RAM 540. The computer 50 can be a desktop computer, a laptop computer, a tablet computer, or a cellular phone. In addition, the computer 50 and the molding machine 20 can interact using wired links, wireless links, a combination thereof, or any other known or later developed elements that are capable of supplying and/or communicating data to and from the connected computer 50 and the molding machine 20. Transmission media used as links, for example, can be any suitable carrier for electrical signals, including coaxial cables, copper wire and fiber optics, and may take the form of acoustic or light waves, such as those generated during radio-wave and infrared data communications. The computer 50 may communicate directly with the molding machine 20 over a network; for example, a Wi-Fi network or other local wireless network such as Bluetooth. Alternatively, the computer 50 may also communicate with the molding machine 20 indirectly over a network such as Internet. In some embodiments, the computer 50 may include a computer platform operable to execute applications, which may interact with the molding machine 20.

Figure 4A:
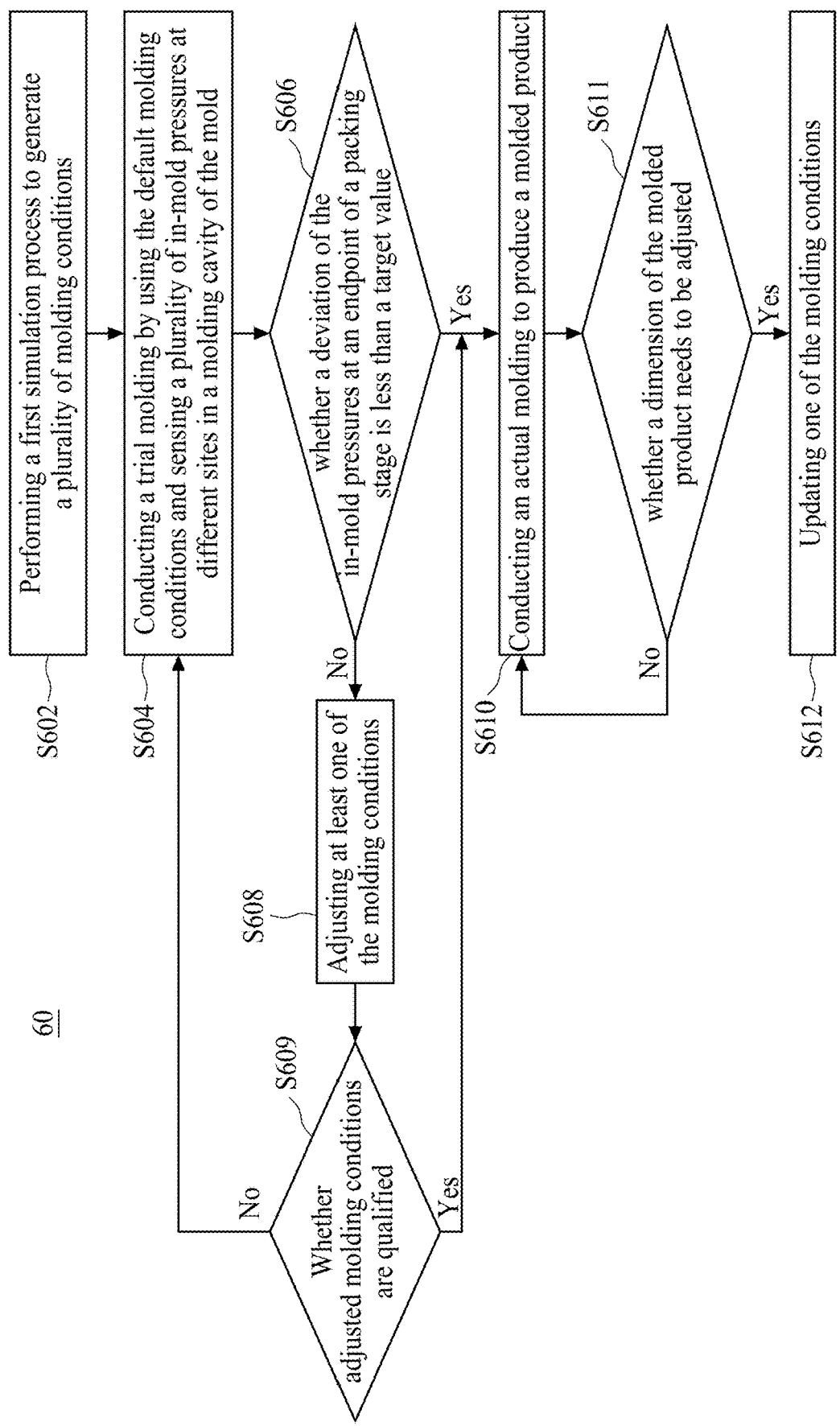
FIG. 4A is a flowchart of a method of producing a molded product in accordance with some embodiments of the present disclosure.

FIG. 4A is a flowchart of a method 60 of producing a molded product in accordance with some embodiments of the present disclosure. Referring to FIG. 4A, the method 60 includes a step S602 of performing a first simulation process to generate a plurality of molding conditions; a step S604 of conducting a trial molding using the molding conditions and sensing a plurality of in-mold pressures at different sites in a molding cavity of the mold; a step S606 of determining whether a deviation of the in-mold pressures at an endpoint of a packing stage is less than a target value; a step S608 of adjusting a default packing pressure profile if the deviation of the in-mold pressures at the endpoint of the packing stage is not less than the target value; a step S609 of determining whether adjusted molding conditions are met; a step S610 of conducting an actual molding to produce the molded product if the deviation of the in-mold pressures at the endpoint of the packing stage is less than the target value; a step S611 of determining whether a dimension of the molded product needs to be adjusted; and a step S612 of updating at least one of the molding conditions if the dimension of the molded product needs to be adjusted.

The following describes an exemplary process flow of the method 60 in accordance with some embodiments of the present disclosure.

Referring to FIG. 4A, the method can begin at step S602, in which a first simulation process is performed to generate default molding conditions. The default molding conditions can include a default injection velocity profile, a default packing pressure profile, and a default period of a packing stage. The default molding conditions may be employed by an injection-molding apparatus 10 to produce a molded product having, for example, a length of 300 mm, a width of 100 mm, and a height of 3.2 mm.

Figure 4B:
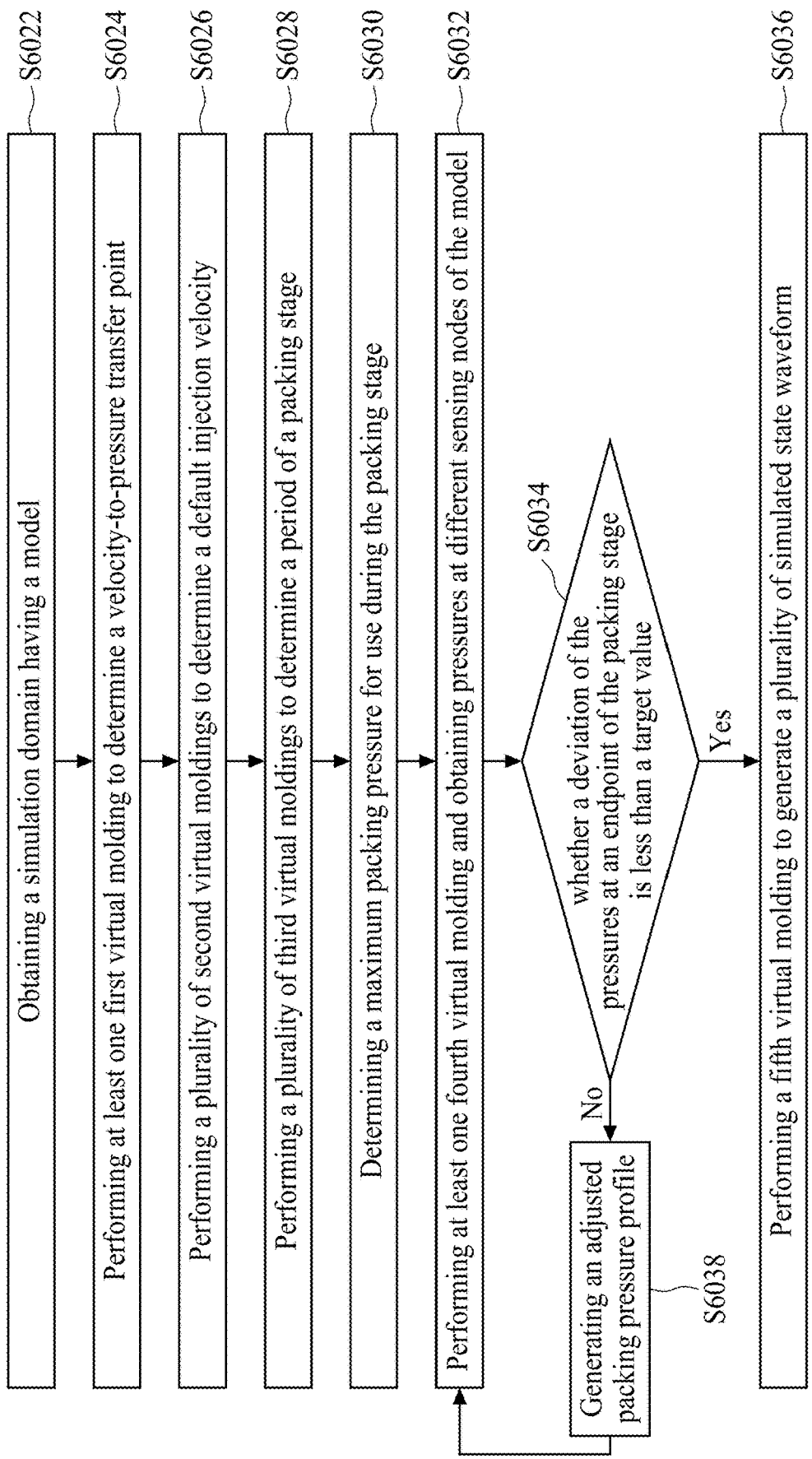
FIG. 4B is a flowchart of a first simulation process for generating molding conditions in accordance with some embodiments of the present disclosure.

The default molding conditions may be generated by simulating a plurality of virtual moldings. In some embodiments, the default injection velocity profile, the default packing pressure profile, and the default period of packing stage are generated using different sets of virtual moldings. Referring to FIG. 4B, a first simulation process for generating the default molding conditions can include a step S6022 of obtaining a simulation domain having a model, a step S6024 of performing a first virtual molding to determine a velocity-to-pressure transfer point (V/P transfer point); a step S6026 of performing a plurality of second virtual moldings using varying injection velocities to determine a default injection velocity; a step S6028 of performing a plurality of third virtual moldings to determine a period of the packing stage; a step S6030 of determining an initial packing pressure for use during the packing stage; a step S6032 of performing at least one fourth virtual molding and obtaining pressures at different sensing nodes of the model; a step S6034 of determining whether a deviation of the pressures at an endpoint of the packing stage is less than the target value; a step 6036 of performing a fifth virtual molding to generate a plurality of simulated state waveforms if the deviation of the pressures at the endpoint of the packing stage is less than the target value; and a step S6038 of generating an adjusted packing pressure profile if the deviation of the pressures at the endpoint of the packing stage is not less than the target value.

Figure 5:
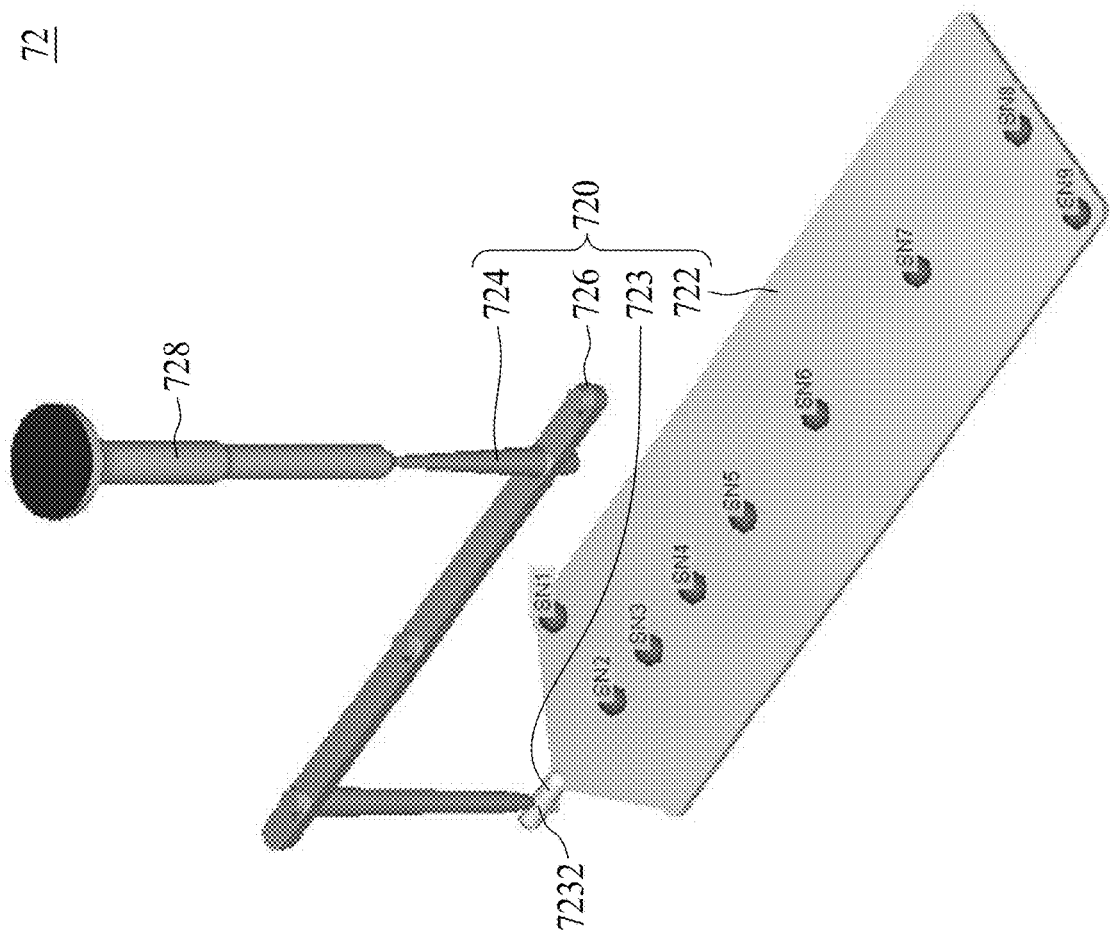
FIG. 5 is a schematic view of a simulation domain in accordance with some embodiments of the present disclosure.

In step S6022, the simulation domain 72 is obtained using a computer-aided design (CAD) tool, which is used to design and develop a model 720 shown in FIG. 5. The model 720 includes a plate 722, a columnar segment 723 connected to the plate 722, a first tapered segment 724, and a curved segment 726 connecting the columnar segment 723 to the tapered segment 724. Referring to FIGS. 1 and 5, the plate 722 in the simulation domain 72 corresponds to the mold cavity 332 in the genuine domain, the first tapered segment 724 in the simulation domain 72 corresponds to the sprue 338 in the genuine domain, and the curved segment 726 in the simulation domain 72 corresponds to the runner 336 in the genuine domain. Additionally, a plurality of sensing nodes SN1 to SN9, corresponding to some of the sensors 260 in the genuine domain, can be specified in the simulation domain 72. In some embodiments, the sensing nodes SN1 to SN9 may be located at different sites of the plate 722. In some embodiments, the simulation domain 72 may further include a second tapered segment 728 connected to the first tapered segment 724. The second tapered segment 728 may correspond to the nozzle 450 in the genuine domain.

After the simulation domain 72 is obtained, the first virtual molding can be simulated to determine a velocity-to-pressure transfer point (V/P transfer point). Typically, the V/P transfer point is a point at which the molding machine 20, in the genuine domain, transfers from the filling stage to the packing stage. The V/P transfer point is typically initiated by the screw position (i.e., the start filling point of the screw 220), and the start filling point of the screw 220 can be obtained by simulating the first virtual molding using a selected material shown in FIG. 6. In some embodiments of the present disclosure, the selected material for the simulation is high-impact polystyrene (HIPS) having an ejection temperature of about 99° C. and a freezing temperature of about 119° C.

Generally, in the genuine domain, the volume of the molding material 100 to be injected into the mold 30 can be determined by the governing equation (1):

$$V_m = V_S \times \frac{v_m}{v_s} \qquad (1)$$

where Vs represents the volume of the space part 330 of the mold 30, Vm represents a volume of the molding material 100 in the barrel 210, $v_s$ represents a specific volume of the molded product, and $v_m$ represents a specific volume of the molding material 100 in the barrel 210.

The first virtual molding is performed to determine a volume of the model 720, and hence to determine the V/P transfer point. Specifically, the first virtual molding simulates injecting a shot of the selected material into the model 720 during a single injection cycle, including a filling stage and a packing stage, thereby obtaining a volume of the selected material in the model 720. During the first virtual molding, the selected material may travel from the first tapered segment 724, through the curved segment 726 and the columnar segment 723 and into the plate 722, and a leading edge of the selected material (melt front) may be presented over time.

The molding phenomena of the selected material can be simulated using the following governing equations (2) to (5):

$$\frac{\partial \rho}{\partial t} + \nabla \cdot \rho u = 0 \qquad (2)$$

$$\frac{\partial}{\partial t}(\rho u) + \nabla \cdot (\rho u u - \sigma) = \rho g \qquad (3)$$

$$\rho C_P \left( \frac{\partial T}{\partial t} + u \cdot \nabla T \right) = \nabla \cdot (k \nabla T) + \eta \dot{\gamma}^2 \qquad (4)$$

$$\sigma = -pI + \eta(\nabla u + \nabla u^T) \qquad (5)$$

where ρ represents density, t represents time, u represents velocity vector (flow velocity), g represents gravitational force, η represents viscosity, T represents temperature, k represents thermal conductivity, $C_P$ represents specific heat, and $\dot{\gamma}$ represents shear rate. σ is a stress tensor that can be decomposed into an isotropic part and a non-isotropic part, as in equation (5); p and I represent equilibrium pressure and an identity matrix, respectively.

The first virtual molding solves the governing equations (2) to (5) by a transient state analysis and generates the volume of the selected material in the model 720. The transient state analysis (virtual molding) can be performed numerically using a computing apparatus. See, e.g., Rongyeu Chang, and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, the entirety of which is incorporated herein by reference. During the transient state analysis, the process variables that change with time are not zero; i.e., the partial derivatives (∂/∂t) in the governing equations (2) to (5) are not considered zero.

After the volume of the selected material in the model 720 is obtained, the selected material to be injected into the model 720 can be calculated using the governing equation (1). Subsequently, a start filling point for the setting of the screw 220 can be determined by the governing equation (6):

$$L = \frac{V_m}{\frac{\pi \times D^2}{4}} + (0.15D) \qquad (6)$$

where D represents the diameter of the screw 220, and L represents the start filling point of the screw 220.

Generally, in the genuine domain, an over-pressure condition may occur if the space part 330 of the mold 30 is completely filled with the molding material 100 (i.e., 100% of the space part 330 is filled). As such, the V/P transfer point is specified using one or more short shots. The short shot is an incomplete filling of the space part 330 of the mold 30 in the genuine domain. That is, the molding material 100 does not fill the entire space part 330 of the mold 30 during each short shot. In some embodiments, 99% of the space part 330 of the mold 30 is filled during the short shots.

In order to prevent the over-pressure condition mentioned above, during the first virtual molding, the V/P transfer point should preferably occur when the model 720 is approximately full (for example, 99.8% full), to promote efficient packing; therefore, in the present disclosure, a default start filling point of the screw 220 is selected to be 16 mm.

Referring again to FIG. 4B, the first simulation process continues with the step S6026, in which the second virtual moldings are simulated to determine the injection velocity. The second virtual moldings are simulated using different injection velocities. In some embodiments, the second virtual moldings are simulated using the injection velocities of 5 mm/s, 10 mm/s, 20 mm/s, 30 mm/s, 40 mm/s, 50 mm/s, 60 mm/s, 70 mm/s, and 80 mm/s and other parameters shown in FIG. 7, wherein the position in the filling stage is the default start filling point of the screw 220 obtained from the first virtual molding. Notably, the second virtual moldings are simulated using varying packing pressures and varying packing times. In particular, during each second virtual molding, the selected material is injected into the model 720 using a first packing pressure of 960 bars for 7 seconds, a second packing pressure of 480 bars for 0.5 seconds, and a third packing pressure of 240 bars for 0.5 seconds.

Figure 8:
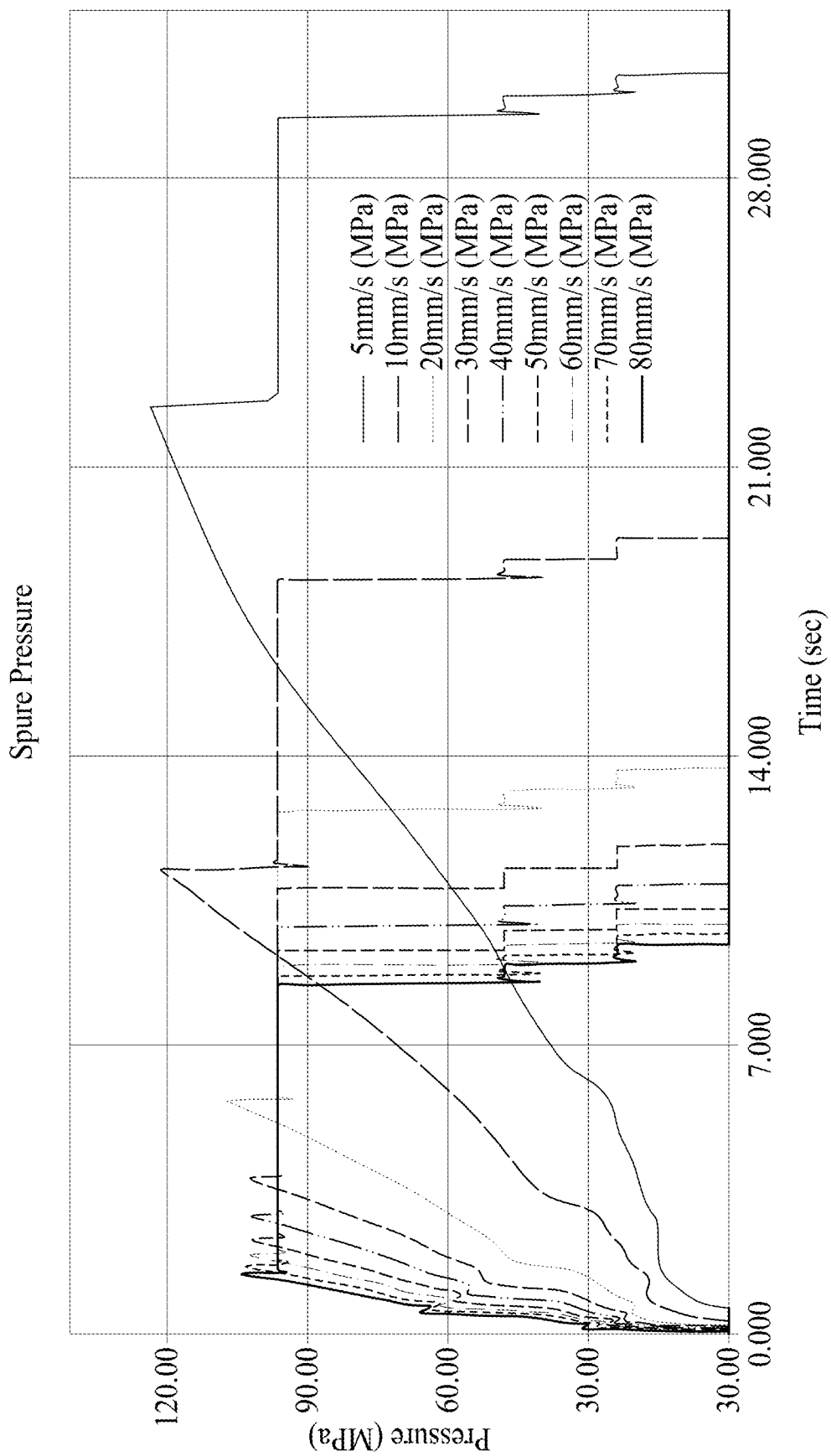
FIG. 8 is a chart showing a plurality of pressure profiles obtained from the second virtual moldings in accordance with some embodiments of the present disclosure.
Figure 9:
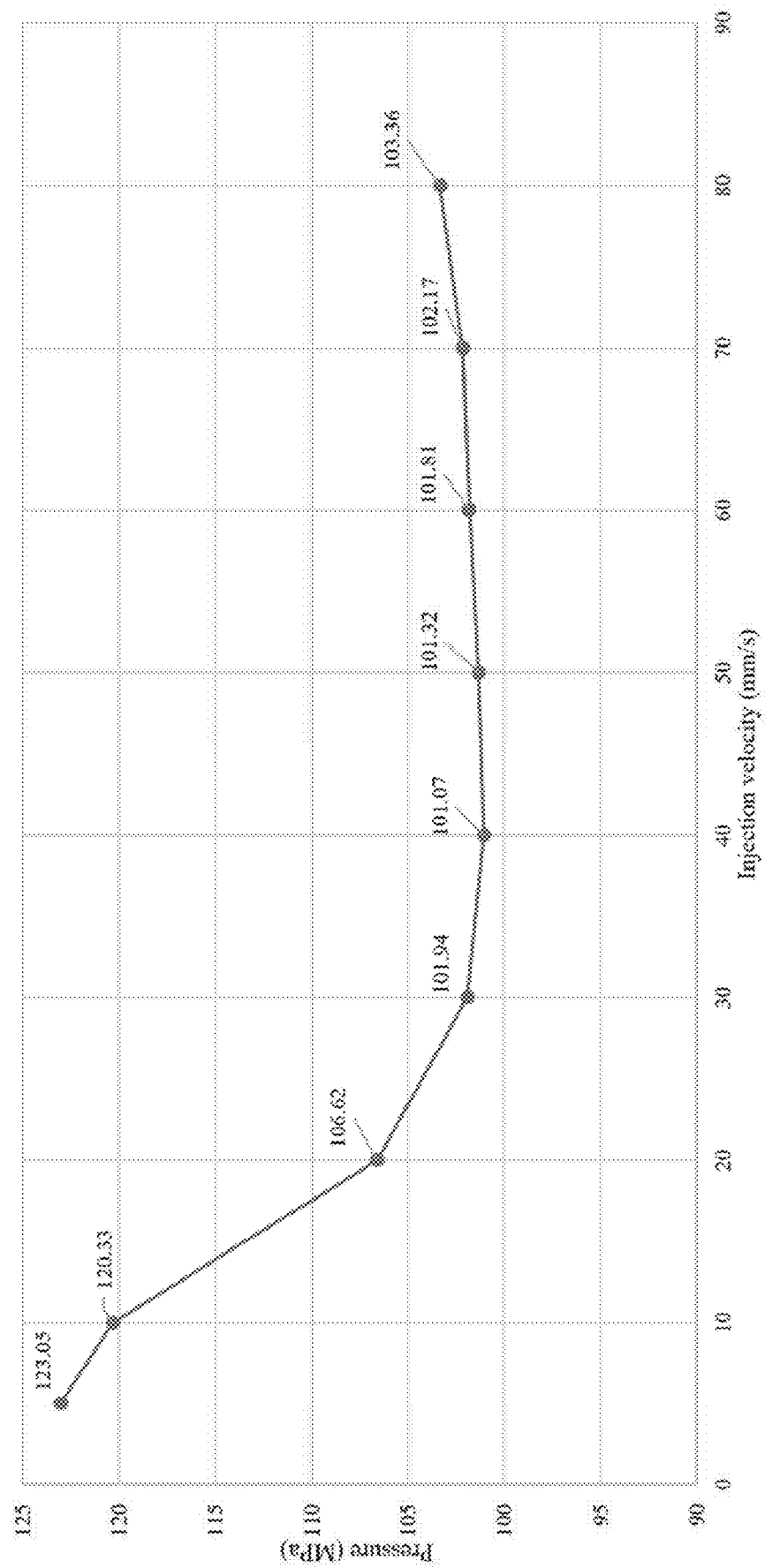
FIG. 9 is a chart showing a plurality of peak pressures obtained from the second virtual moldings in accordance with some embodiments of the present disclosure.

During the simulation of the second virtual moldings, the pressures at the first tapered segment 724 are obtained. The simulation of the second virtual moldings solves the governing equations (2) to (5) by a transient state analysis, thus obtaining the pressures. FIG. 8 is a chart showing a plurality of pressure profiles obtained from the second virtual moldings in accordance with some embodiments of the present disclosure. The pressures at the first tapered segment 724 obtained using the different injection velocities during the simulation of the second virtual moldings are plotted against time, as shown in FIG. 8. Referring to FIG. 8, each of the pressure profiles has a peak pressure. The peak pressures obtained from different second virtual moldings are plotted against the injection velocity to create a substantially U-shaped waveform shown in FIG. 9.

The peak pressures are analyzed to determine the default injection velocity. Specifically, an insufficient injection velocity causes the leading edge of the selected material to freeze before it reaches the rear end of the plate 722 opposite to the columnar segment 723. Accordingly, the peak pressure increases. In addition, greater injection velocity corresponds to greater peak pressure. Generally, the clamping assembly 40 applies a clamping force during the molding process that is greater than the force exerted by the injection pressure acting to separate the mold halves, thereby holding the mold halves together while the molding material 100 is injected into the space part 330. Therefore, the default injection velocity is selected to avoid separation of the mold halves during the molding process. In some embodiments, the default injection velocity may be selected to be in a range between 30 mm/s and 70 mm/s, for example, 40 mm/s. In some embodiments, the charts in FIGS. 8 and 9 may be shown on the display 280 of the molding machine 20 and/or the display 570 of the computer 50.

Referring again to FIG. 4B, the first simulation process continues with the step S6028, in which the third virtual moldings are simulated to determine the period of the packing stage. The third virtual moldings may be simulated using the default start filling point obtained from the first virtual molding, the default injection velocity obtained from the second virtual moldings, and varying packing times shown in FIG. 10.

Typically, in the genuine domain, as the molding material 100 at the gate 334 solidifies, the molding material 100 in the barrel 210 cannot be injected into the mold cavity 332; accordingly, the pressure at each site in the mold cavity 332 stops changing. In order to realize the pressure variation in the model 720, during the performing of the third virtual moldings, pressures at different sites of the model 720 are obtained. For example, the pressures at the first tapered segment 724 and the sensing nodes SN2 and SN8, as shown in FIG. 5, are obtained; the sensing node SN2 is close to the columnar segment 723 where a gate node 7232, corresponding to the gate 334 (as shown in FIG. 1) in the genuine domain, is positioned. The simulation of the third virtual moldings solves the governing equations (2) to (5) by a transient state analysis to simulate the appropriate physical response of the selected material in the model 720, and thus the pressures are obtained.

Figure 11:
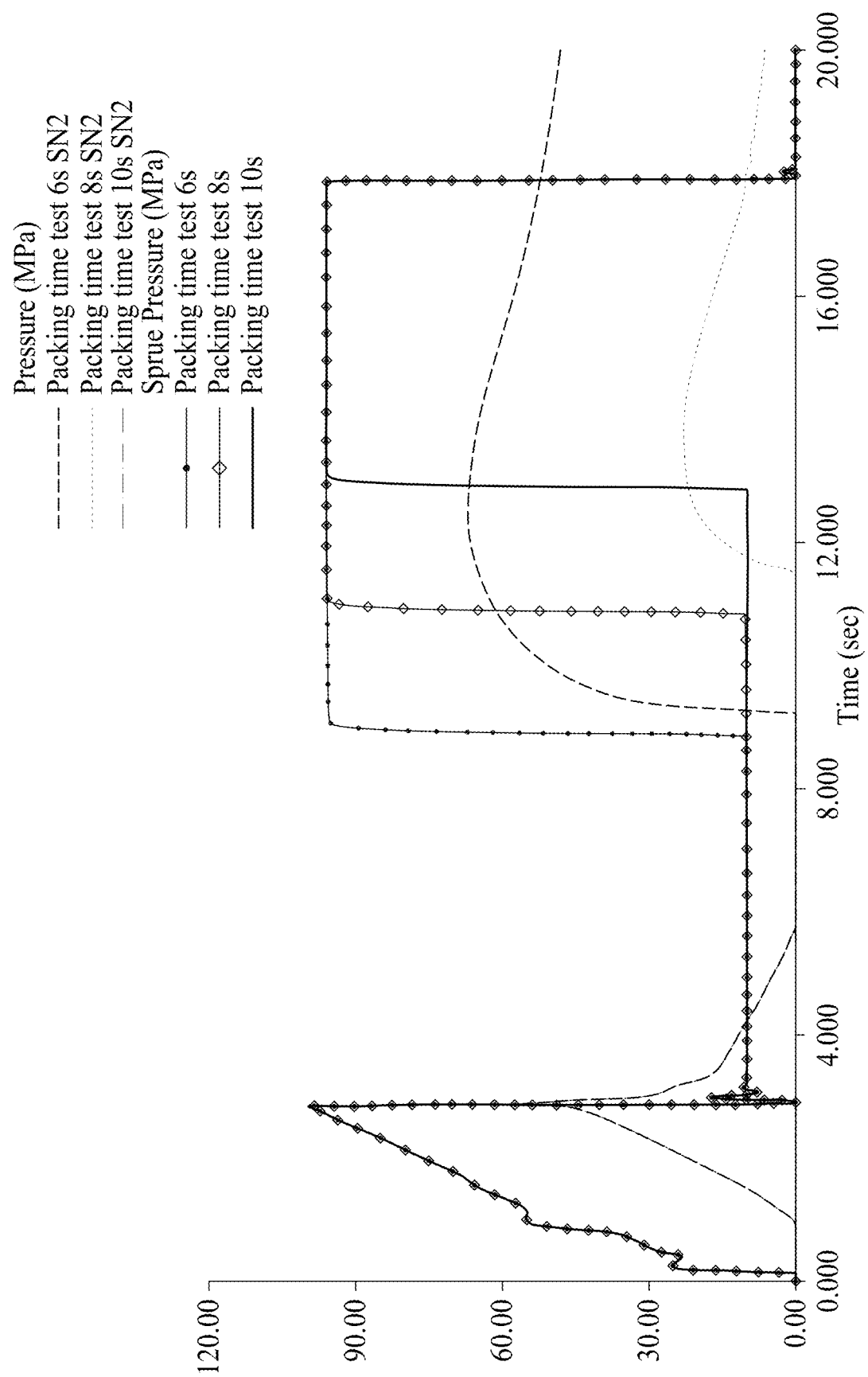
FIG. 11 is a chart showing a plurality of simulated pressure profiles obtained from the third virtual moldings in accordance with some embodiments of the present disclosure.

FIG. 11 is a chart showing a plurality of simulated pressure profiles obtained from the third virtual moldings in accordance with some embodiments of the present disclosure. Referring to FIG. 11, the pressure profiles marked as "Packing time test 6 s SN2" and "Packing time test 6 s" are obtained by applying a relatively high pressure for 9 seconds after applying a relatively low pressure for 6 seconds; the pressure profiles marked as "Packing time test 8 s SN2" and "Packing time test 8 s" are obtained by applying a relatively high pressure for 7 seconds after applying a relatively low pressure for 8 seconds; and the pressure profiles marked as "Packing time test 10 s SN2" and "Packing time test 10 s" are obtained by applying a relatively high pressure for 10 seconds after applying a relatively low pressure for 5 seconds. In addition, the pressures at the tapered segment 724 and the sensing node SN2 are obtained by using the packing pressure of 100 bars during the performing of the third virtual moldings. As shown in FIG. 11, the pressure at the first tapered segment 724 increases as the selected material is transferred from the second tapered segment 728 and into the model 720. Under the conditions of applying the relatively high pressure after applying the relatively low pressure for 6 and 8 seconds, the pressure at the sensing node SN2 increases after the pressure at the first tapered segment 724 increases. Additionally, the pressure at the sensing node SN2 does not vary when the relatively high pressure is applied after the relatively low pressure is applied for 10 seconds. That is, the selected material at the gate node 7232 solidifies. Therefore, the period of the packing stage is selected to be 10 seconds. In some embodiments, one or more additional third virtual moldings may be performed using the default start filling point, the default injection velocity, and the other packing pressures between 100 bars and 900 bars to ensure that the selected material at the gate node 7232 can completely solidify after 10 seconds has elapsed.

Referring again to FIG. 1, generally, the clamping assembly 40 can provide a clamping force sufficient to hold the complementary mold halves tightly together during the injection of the molding material 100 into the space part 330 in the mold 30. During the filling stage, greater amounts of the molding material 100 in the space part 330 correspond to greater injection pressure for forcefully injecting the molding material 100 into the space part 330 inside the mold 30. In addition, greater injection pressure requires that a greater clamping pressure be used. If the injection pressure is greater than the clamping force, the mold halves may not be able to remain in complete contact and the molding material 100 may spill outside the mold cavity 332, thereby generating flash. Accordingly, a maximum of the injection pressure needs to be limited in accordance with the clamping force. For the same reason, a maximum of the packing pressure (the maximum packing pressure) is limited in accordance with the clamping force. Notably, the limitation of the maximum of the injection pressure may result in the molding machine 20, in the genuine domain, transferring from the filling stage to the packing stage with the injection pressure limited. Therefore, a period of the filling stage is determined. In addition, a default injection velocity profile is defined at a substantially constant level.

Referring again to FIG. 4B, the first simulation process then proceeds to a step S6032, in which at least one fourth virtual molding is performed to obtain pressures at an endpoint of the packing stage from the sensing nodes SN1 to SN9, as shown in FIG. 5. In some embodiments, the fourth virtual molding is performed using the default injection velocity profile, the default start filling point, the period of the packing stage, and the maximum packing pressure during the packing stage, and the pressures at the sensing nodes SN1 to SN9 may be obtained during the performing of the fourth virtual molding. The performing of the fourth virtual moldings may allow the governing equations (2) to (5) to be solved by a transient state analysis, which allows the pressures at the endpoint of the packing stage to be obtained.

After the fourth virtual molding is completed, the first simulation process proceeds to a determination step S6034. In the step S6034, it is determined whether a deviation of the pressures at the endpoint of the packing stage is less than the target value (for example, 50 bars). If the deviation of the pressures at the endpoint of the packing stage obtained from the fourth virtual molding is less than the target value, an initial packing pressure profile, including a constant maximum packing pressure, functions as the default packing pressure profile. If, on the other hand, the deviation of the pressures at the endpoint of the packing stage obtained from the fourth virtual molding is not less than the target value, an adjusted packing pressure profile is generated in accordance with the initial packing profile (step S6038).

Figure 12:
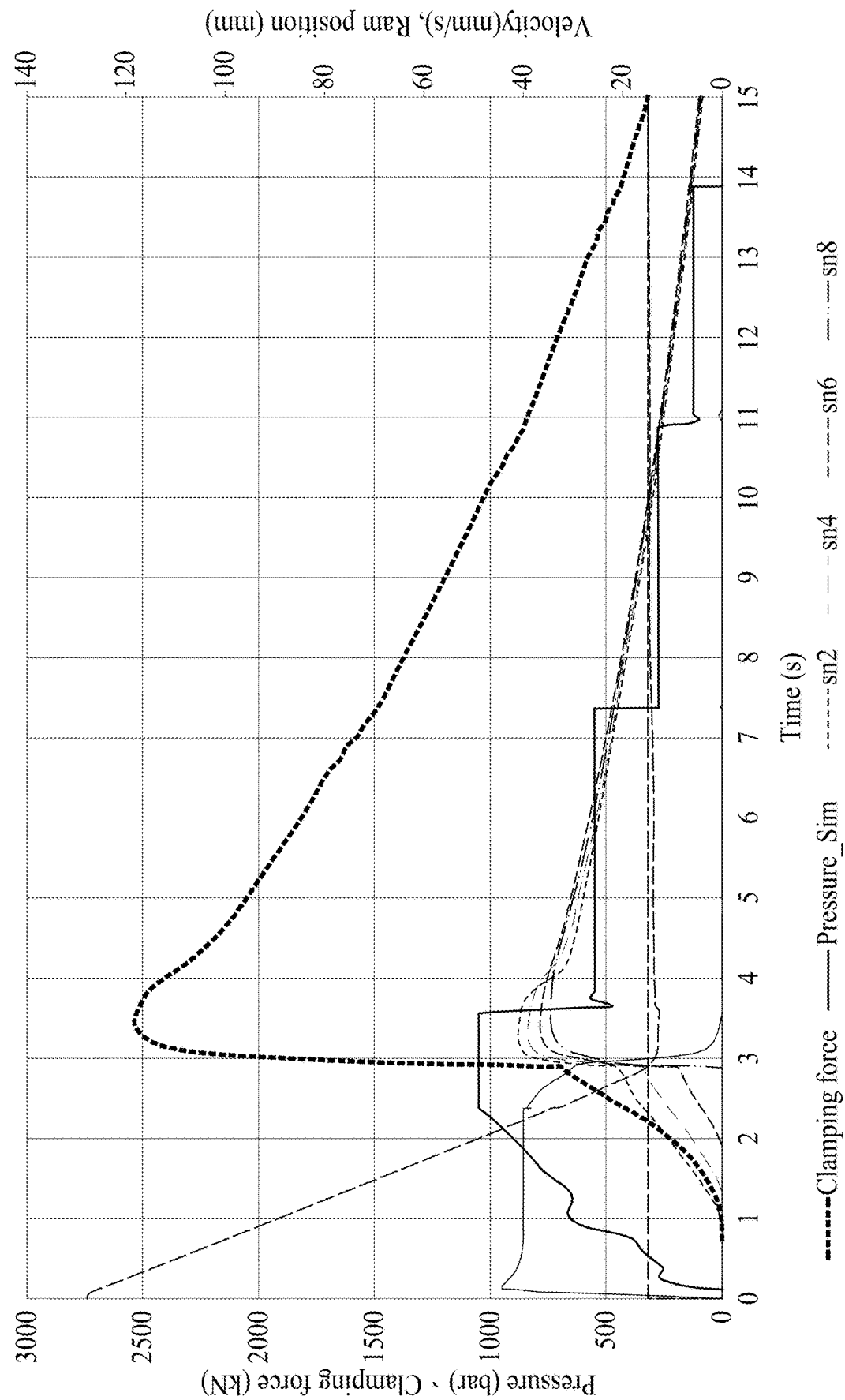
FIG. 12 is a chart showing a plurality of pressure profiles generated using the default injection velocity profile, the default packing pressure profile, and the default start fill point in accordance with some embodiments of the present disclosure.
Figure 13:
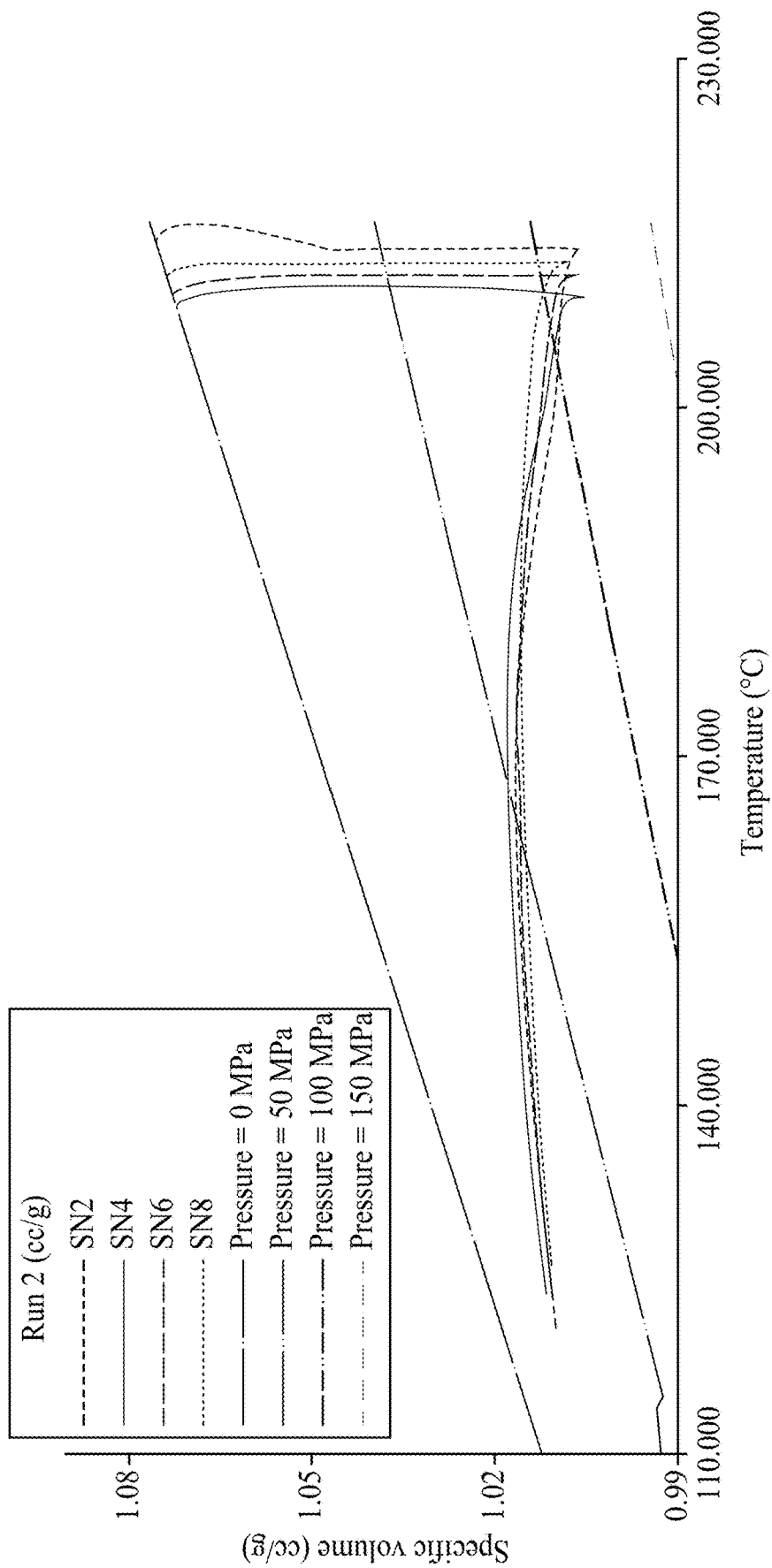
FIG. 13 is a chart showing a plurality of simulated state waveforms obtained from the sensing nodes of the simulation domain from the virtual molding using the molding conditions.

In order to decrease the deviation of the pressures at the endpoint of the packing stage, the adjusted packing pressure profile may have varying pressures. For example, the packing pressure applied to the selected material may be decreased over time for achieving satisfactory performance, such as preventing the molding material 100 from returning into the barrel 210. The adjusted packing pressure profile having varying packing pressure may be represented by a sloped waveform. Alternatively, the adjusted packing pressure profile having varying pressures may be represented by a stepped waveform. The adjusted packing pressure profile represented by the sloped waveform can be achieved by dividing the packing stage into a plurality of sections, where each section has a substantially constant packing pressure. For example, in FIG. 12, the packing stage is divided into four sections. In particular, a first section of the packing stage following the filling stage may have a first packing pressure, which is equal to the maximum packing pressure for controlling the clamping force. A second section following the first section can have a second packing pressure less than the first packing pressure for controlling pressure convergence, and a third section following the second section may have a third packing pressure less than the second packing pressure to achieve stable pressure control. A fourth section between the third section and the endpoint of the packing stage, employed to reduce residual stress, can have a fourth packing pressure less than the third packing pressure. In some embodiments, the second packing pressure is, for example, about 50% of the first packing pressure, the third packing pressure is, for example, about 50% of the second packing pressure, and the fourth packing pressure is, for example, about 50% of the third packing pressure.

After the generation of the adjusted packing pressure profile, the first simulation process returns to the step S6032, shown in FIG. 4B, to perform another fourth virtual molding to thereby obtain the pressures at the endpoint of the packing stage. Subsequently, the first simulation process proceeds to the determination step S6034, wherein it is determined whether the deviation of the pressures at an endpoint of the packing stage is less than the target value. If the deviation of the pressures at an endpoint of the packing stage is not less than the target value, the first simulation process proceeds to the step S6038 again to generate another adjusted packing pressure profile. The adjusted packing pressure profile can be obtained by modifying one or more pressure values or two or more periods of the first to fourth sections depicted in FIG. 12 based on the deviation of the pressures at an endpoint of the packing stage by the CAE simulation software. In some embodiments, the adjusted packing pressure profile may be automatically generated by the computer 50.

If on the other hand, the deviation of the pressures at an endpoint of the packing stage is less than the target value, the adjusted packing pressure profile is determined to be qualified and can function as the default packing pressure profile. In some embodiments, an optional fifth virtual molding may be performed using the default injection velocity, the default packing pressure profile, the default period of packing stage, and the default start filling point to generate a plurality of simulated state waveforms (step S6036). The simulated state waveforms express a variation of a specific volume of the selected material with respect to a pressure and a temperature at each sensing node SN1 to SN9 of the simulation domain 72 and can be used for ensuring whether a deviation of pressures involved in the state waveforms is less than the target value.

Referring back to FIG. 4A, after the molding conditions are generated, the method 60 proceeds to the step S604, in which the trial molding is conducted using the molding conditions. During the conducting of the trial molding, a plurality of in-mold pressures at different sites in the molding cavity 332 of the mold 30 are measured by the sensors 260. Subsequently, the method proceeds to the step S606 to determine whether a deviation of the in-mold pressures at the endpoint of a packing stage is less than the target value. If the deviation of the in-mold pressures at the endpoint of the packing stage is less than the target value, then the method proceeds to the step S610, in which the actual molding for producing the molded product is conducted using the molding conditions that were used for conducting the previous trial molding. If, on the other hands, the deviation of the in-mold pressures at the endpoint of a packing stage is not less than the target value, the method 60 proceeds to the step S608, in which at least one of the molding conditions is adjusted.

Figure 14:
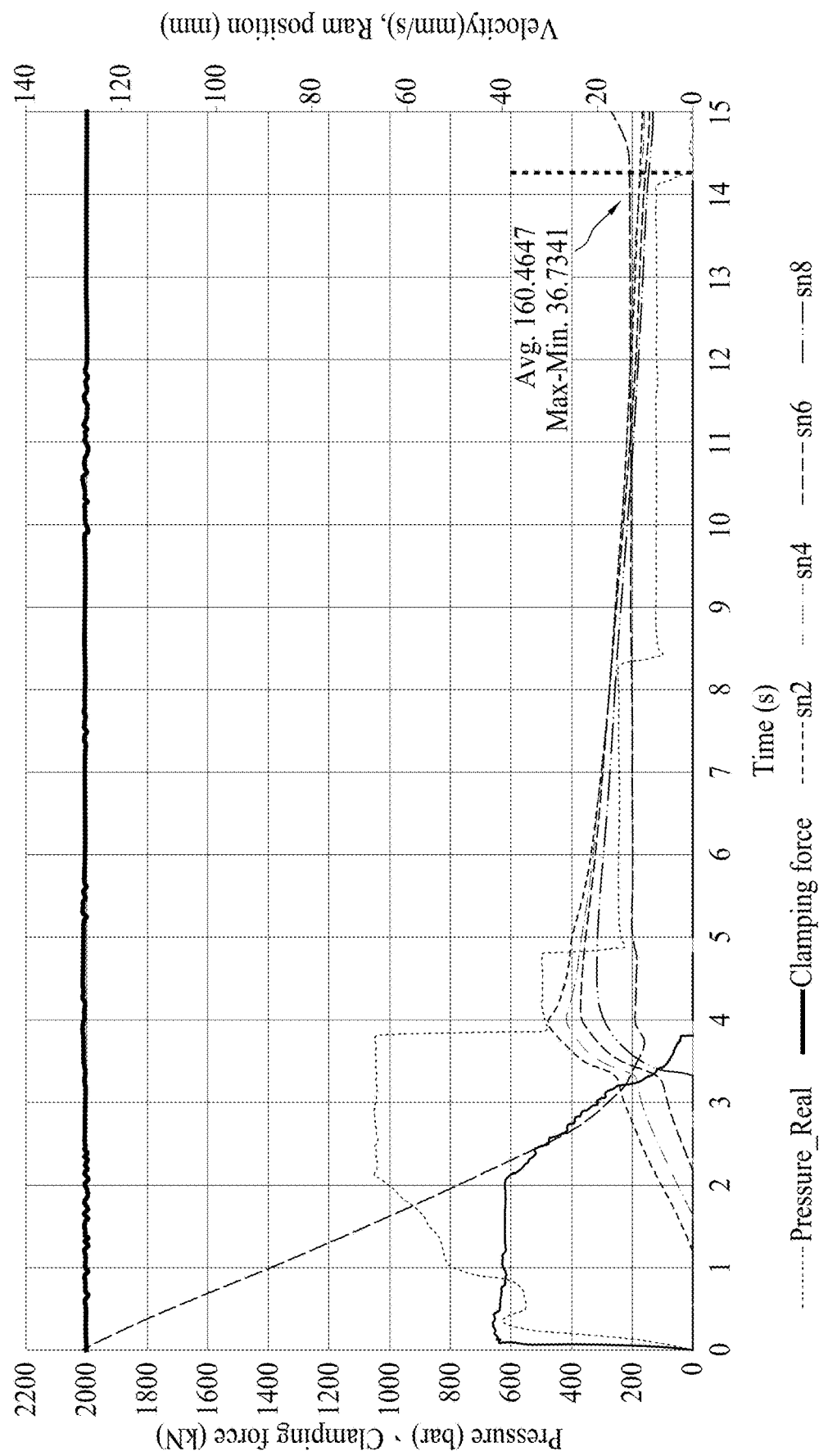
FIG. 14 is a chart showing a plurality of pressure profiles generated using adjusted molding conditions in accordance with some embodiments of the present disclosure.

In step S608, one or more molding conditions can be adjusted using a human-machine interface of the molding machine 20. In some embodiments, the default packing pressure profile can be adjusted during the step S608. The default packing pressure profile can be adjusted by varying two or more periods of the first to fourth sections of the packing stage. Typically, the pressure convergence during the molding process is controlled using the second section of the packing stage, and a longer period of the second section of the packing stage corresponds to a greater deviation of the in-mold pressures at the endpoint of the packing stage. Therefore, if the deviation of the in-mold pressures at the endpoint of the packing stage is not less than the target value, the period of the second section of the packing stage can be reduced, as shown in FIG. 14. Additionally, at least one period of the third and fourth sections is changed to maintain the period time of the packing stage. For example, the fourth section of the packing stage is extended. Additionally, during the step S608, the default injection velocity profile may be adjusted in response to the adjustment of the default packing pressure profile to reduce the deviation of the in-mold pressures at the end point of the packing stage.

Figure 15:
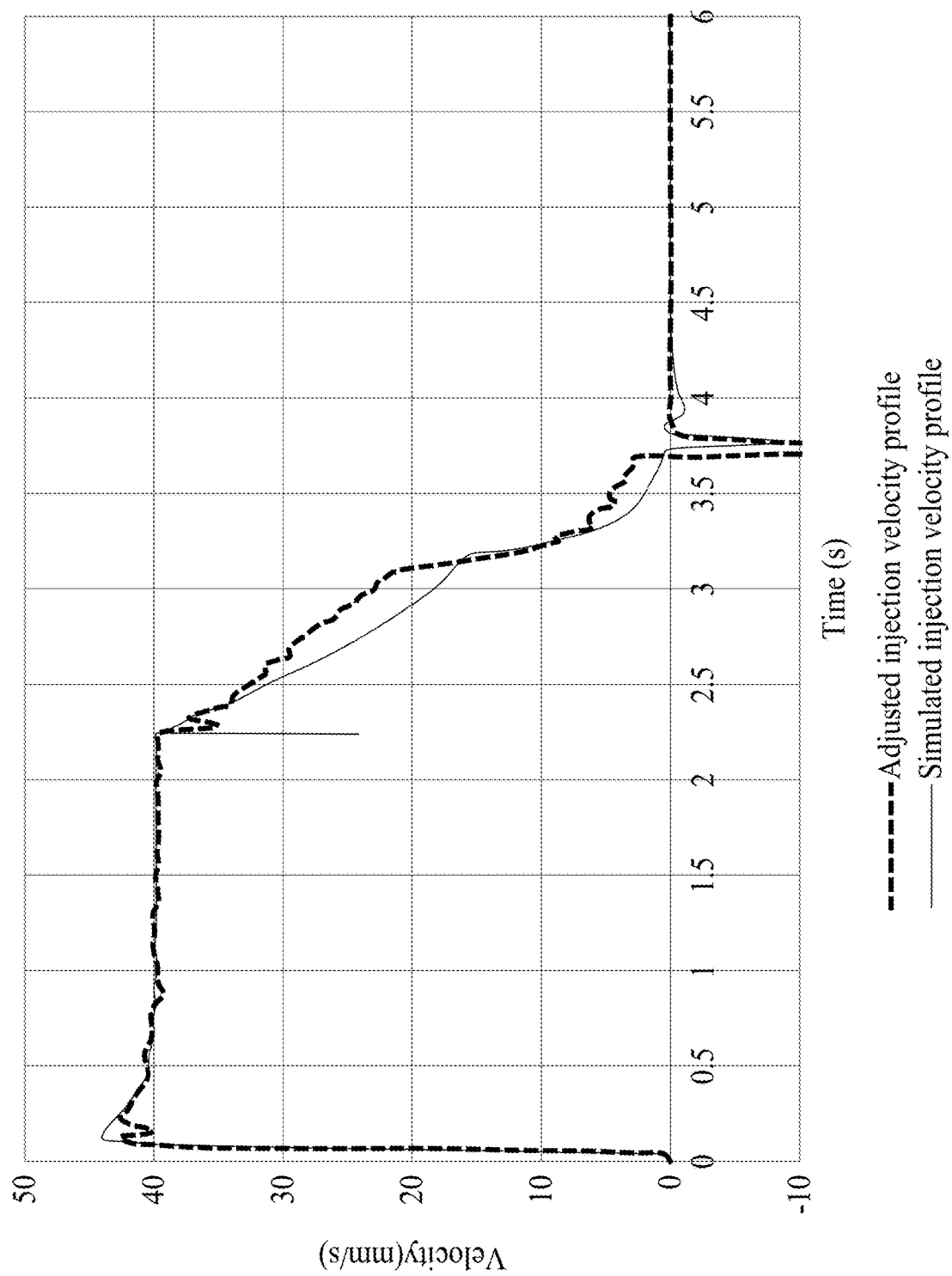
FIG. 15 is a chart showing injection velocity profiles obtained from a trial molding and a second simulation process.
Figure 16:
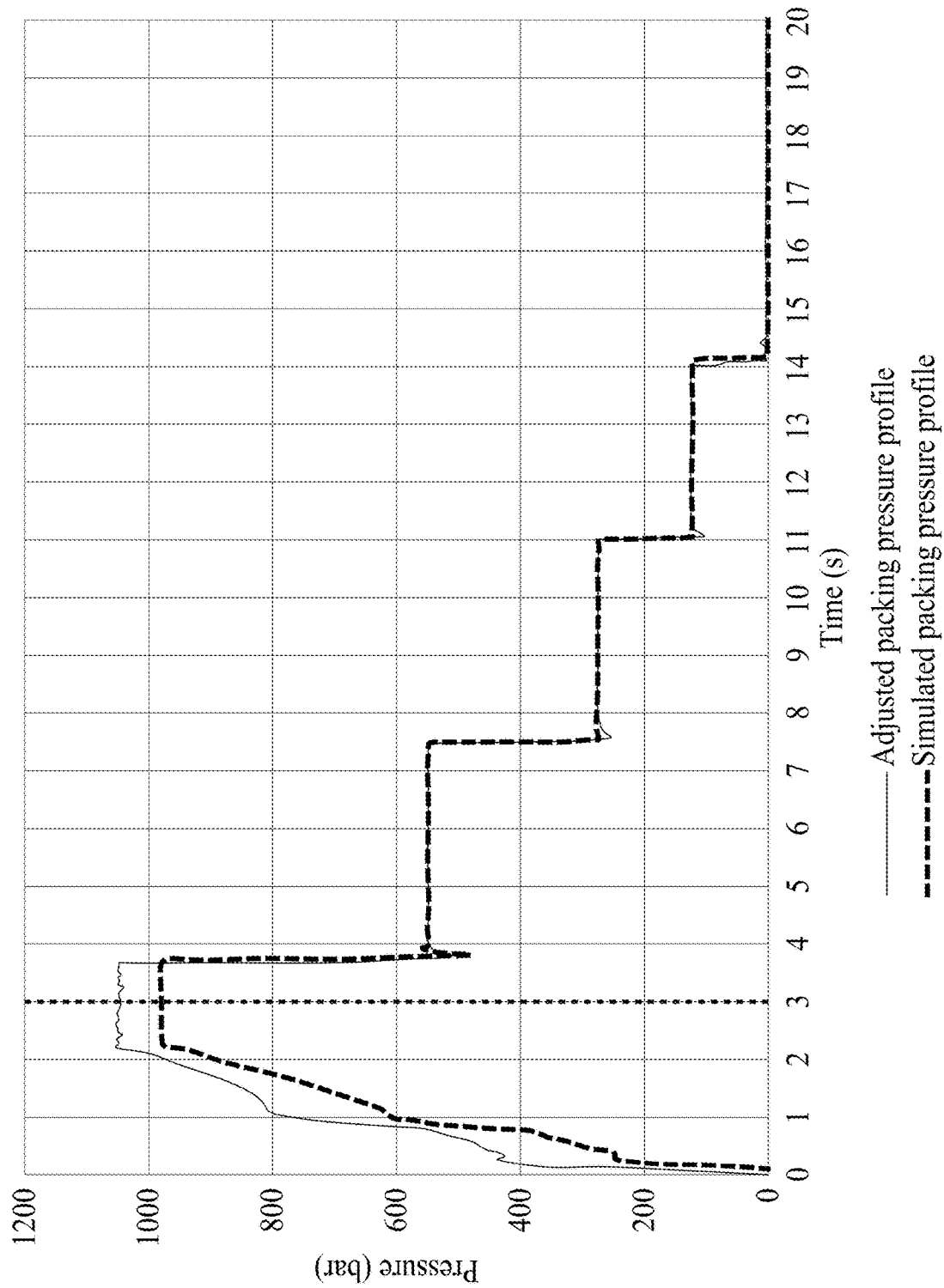
FIG. 16 is a chart showing pressure profiles obtained from a trial molding and a second simulation process.

After the step S608, the method proceeds to the step S609, in which it is determined whether the adjusted molding conditions are qualified. In step S609, a second simulation process is performed to generate a simulated injection velocity profile and a simulated (in-mold) pressure profile to determine whether the adjusted molding conditions are qualified. FIG. 15 is a chart showing a simulated injection velocity profile obtained in the second simulation process and the adjusted injection velocity profile obtained in step S608, and FIG. 16 is a chart showing a simulated pressure profile obtained in the second simulation process and the adjusted pressure profile obtained in the step S608. As clearly shown in FIGS. 15 and 16, the simulated injection velocity profile substantially fits the adjusted injection velocity profile, and the simulated pressure profile substantially fits the adjusted pressure profile; therefore, the adjusted molding conditions are qualified, and the method proceeds to the step S610, in which the actual molding is conducted to produce the molded product. If, on the other hand, the adjusted molding conditions are not qualified, the method returns to the step S604 for conducting the trial molding using the adjusted molding conditions.

Figure 17:
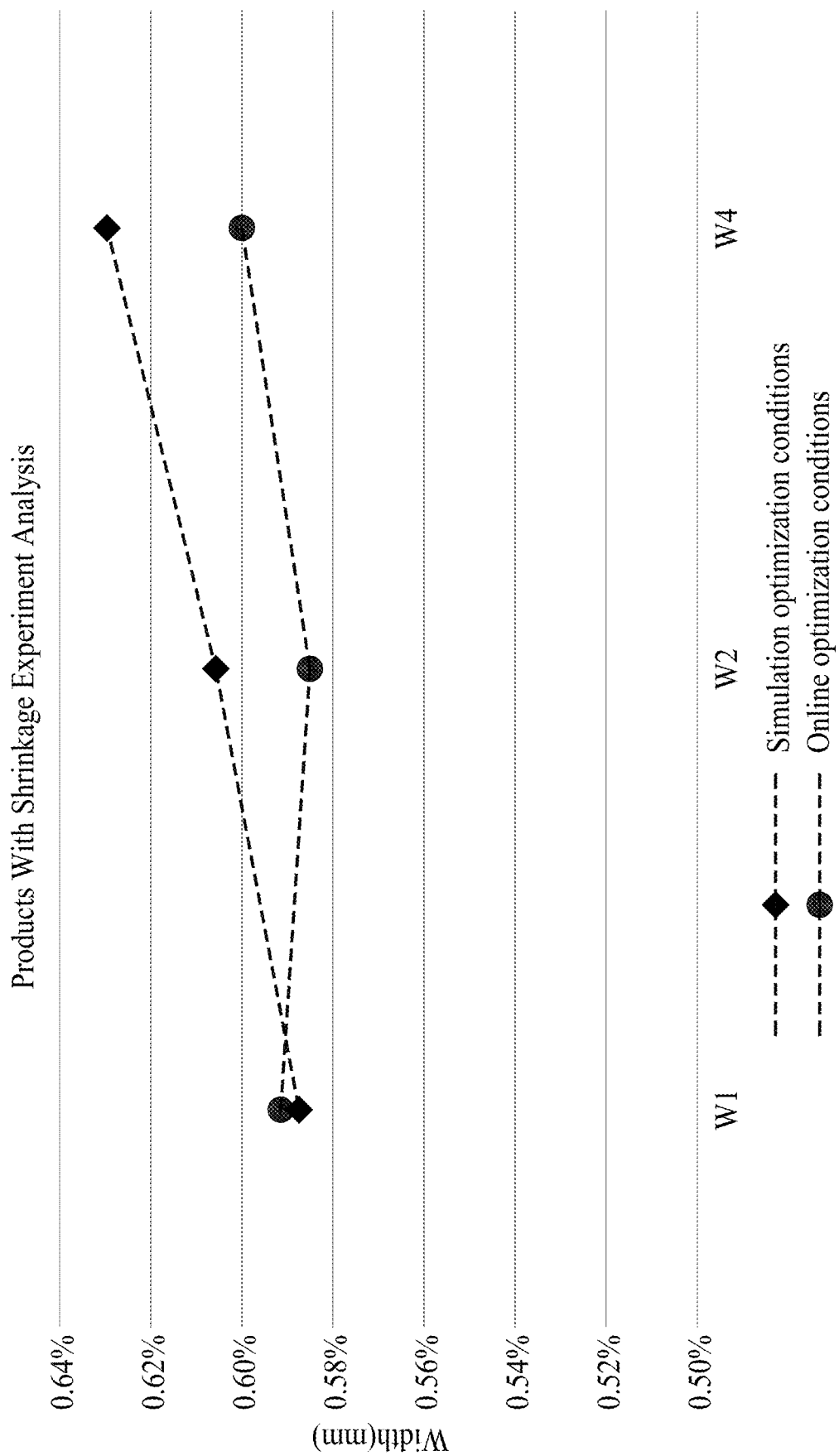
FIG. 17 is a chart showing widths of a molded product produced using molding conditions generated from the first simulation process, and widths of a molded product produced using adjusted molding conditions.
Figure 18:
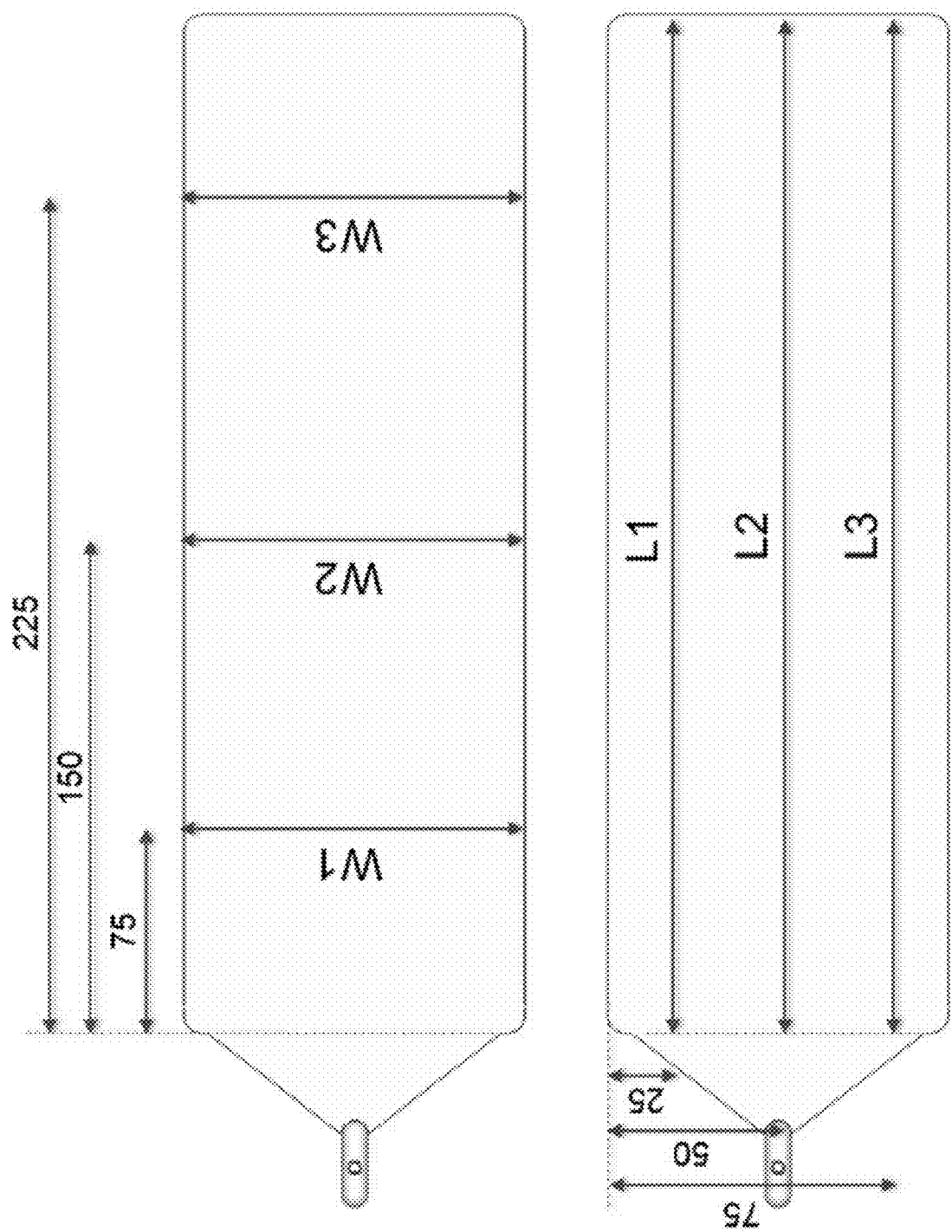
FIG. 18 shows positions for measuring lengths and widths of molded products.

FIG. 17 is a chart showing widths of a molded product produced using default molding conditions (marked as "Simulation optimization conditions") and widths of a molded product produced using adjusted molding conditions (marked as "Online optimization conditions"), wherein the positions for measuring the widths W1 to W3 shown in FIG. 17 are shown in FIG. 18. As can be seen in FIG. 17, the molded product produced using the adjusted molding conditions can exhibit a reduced shrinkage compared to that of the molded product formed using the default molding conditions.

Referring again to FIG. 4A, after the step S610, the method proceeds to the step S611, in which it is determined whether a dimension of the molded product needs to be adjusted. In some embodiments, the injection-molding apparatus 10 can be used to produce acceptable molded products having variable dimensions within a limited range without changing the dimension of the mold cavity 332, as long as the deviation of the in-mold pressures at the endpoint of the packing stage is kept below the target value.

In alternative embodiments, the changing of the dimension of the molded product within the limited range (i.e., dimensional correction) can minimize the dimension errors in the molded product produced using the injection-molding apparatus 10 that is prone to wear or degradation. From a manufacturing perspective, production of quality molded products requires that the finished products meet design specifications and fall within design tolerance limits. Generally, the injection-molding apparatus 10 may suffer from wear or degradation with usage and, as a result, may produce molded products that do not meet the design requirements (design specifications and design tolerance limits). For example, the pressure required for injecting the molding material 100 into the space part 330 inside the mold 30 may cause wear of the mold 30, which can result in molded product failure. The quality of the molded products may be determined by measuring the molded products after they are produced and then comparing the measurements of the molded products to the product specifications, or by monitoring the in-mold pressures at different sites in the mold cavity 332 of the mold 30 and then comparing the deviation of the in-mold pressures at the endpoint of the packing stage to the target value.

After the determination of step S611, if the answer is no, then the actual molding for producing the molded product is conducted using the molding conditions that were used for conducting the previous molding.

Figure 4C:
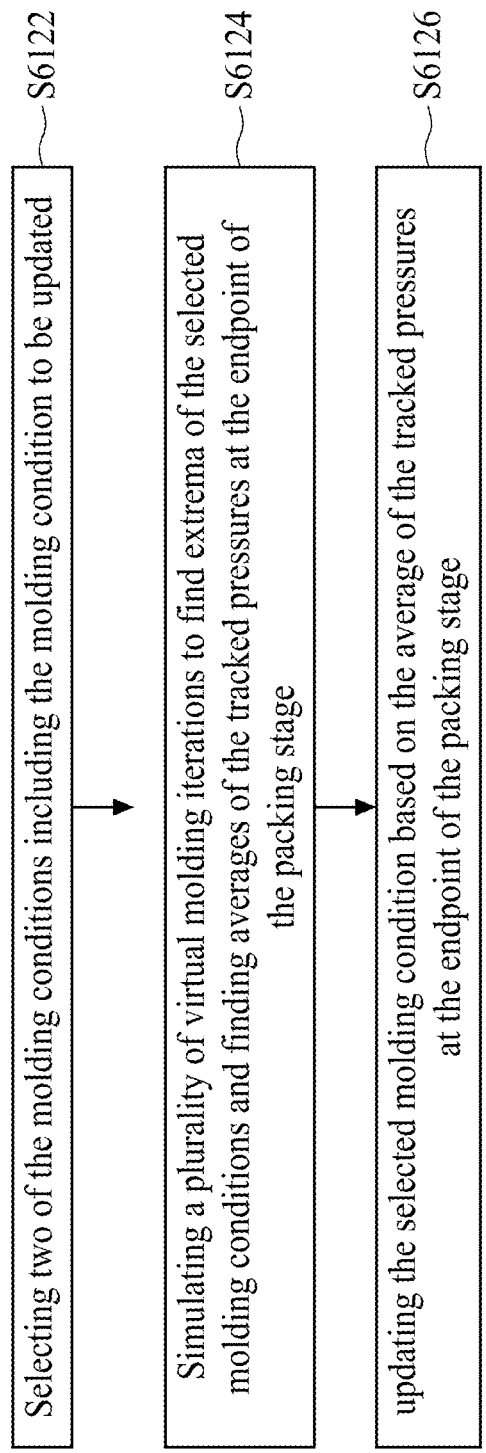
FIG. 4C is a flowchart of a method for adjusted a dimension of a molded product in accordance with some embodiments of the present disclosure.

After the determination of step S611, if the answer is yes, then the method proceeds to a step S612, in which one of the molding conditions is updated before the next conducting of the actual molding. The updated molding condition(s) may be generated by the CAE simulation software. Referring to FIG. 4C, the method for adjusting the dimension of the molded product may include a step of S6122 of selecting two of the molding conditions including the molding condition to be updated; a step S6124 of simulating a plurality of virtual molding iterations to find extrema of the selected molding conditions and finding averages of the pressures obtained at the endpoint of the packing stage; and a step S6126 of updating the selected molding condition based on the average of the pressures obtained at the endpoint of the packing stage.

In the step S6122, the molding conditions may be selected from a melt temperature, a mold temperature, the default injection velocity, the injection pressure, the V/P transfer point (i.e., the default start filling point), the default packing pressure profile and the packing time. In some embodiments, the injection velocity and the V/P transfer point can be selected, wherein the injection velocity is the molding condition to be updated.

Figure 19:
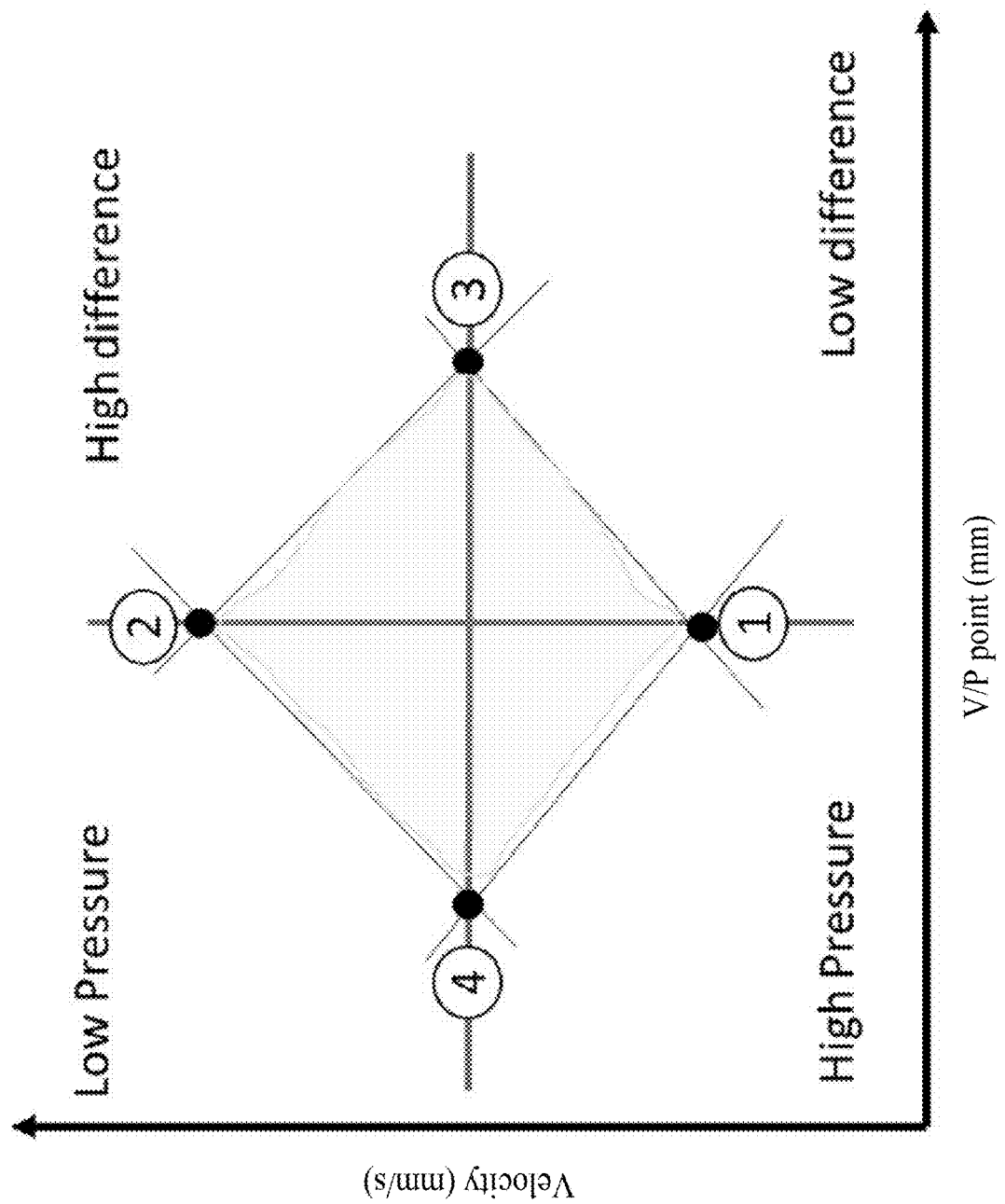
FIG. 19 is a schematic view of a controlling window specified by velocity and V/P transfer point in accordance with some embodiments of the present disclosure.

Subsequently, the method proceeds to the step S6124, in which virtual molding iterations are simulated to find extrema of the selected molding conditions while keeping the deviation of the obtained pressures below the target value. The extrema of the selected molding conditions include a minimum and a maximum of the selected molding conditions. After the extrema of the selected molding conditions are obtained, a controlling window 80, as shown in FIG. 19, can be specified using the extrema of the selected molding conditions. In FIG. 19, the horizontal axis represents the V/P transfer point and the vertical axis represents the injection velocity.

During the simulation of the virtual molding iterations, the pressures at the sensing nodes SN1 to SN9 may be obtained. In particular, the deviations of the pressures at the endpoint of the packing stage and average pressures at the endpoint of the packing stage are generated during the simulation of the virtual molding iterations. Table 1 lists multiple average pressures and the deviations at the endpoint of the packing stage selected from the boundary defined by the extrema marked in the controlling window 80.

TABLE 1

| No. | Injection Velocity (mm/s) | V/P transfer point (mm) | Average pressure at endpoint of the packing stage (bar) | Deviation of the pressures at endpoint of the packing stage (bar) |
| --- | --- | --- | --- | --- |
| 1 | 20 | 16.5 | 53 | 45 |
| 2 | 80 | 16.5 | 274 | 37 |
| 3 | 40 | 20 | 187 | 42 |
| 4 | 40 | 7 | 371 | 48 |

The method then proceeds to the step S6126, in which the selected molding condition is updated based on the average of the pressures at the endpoint of the packing stage. In some embodiments, the dimension of the molded product can be controlled by selecting one of the average pressures from a range defined by the controlling window 80.

Figure 20:
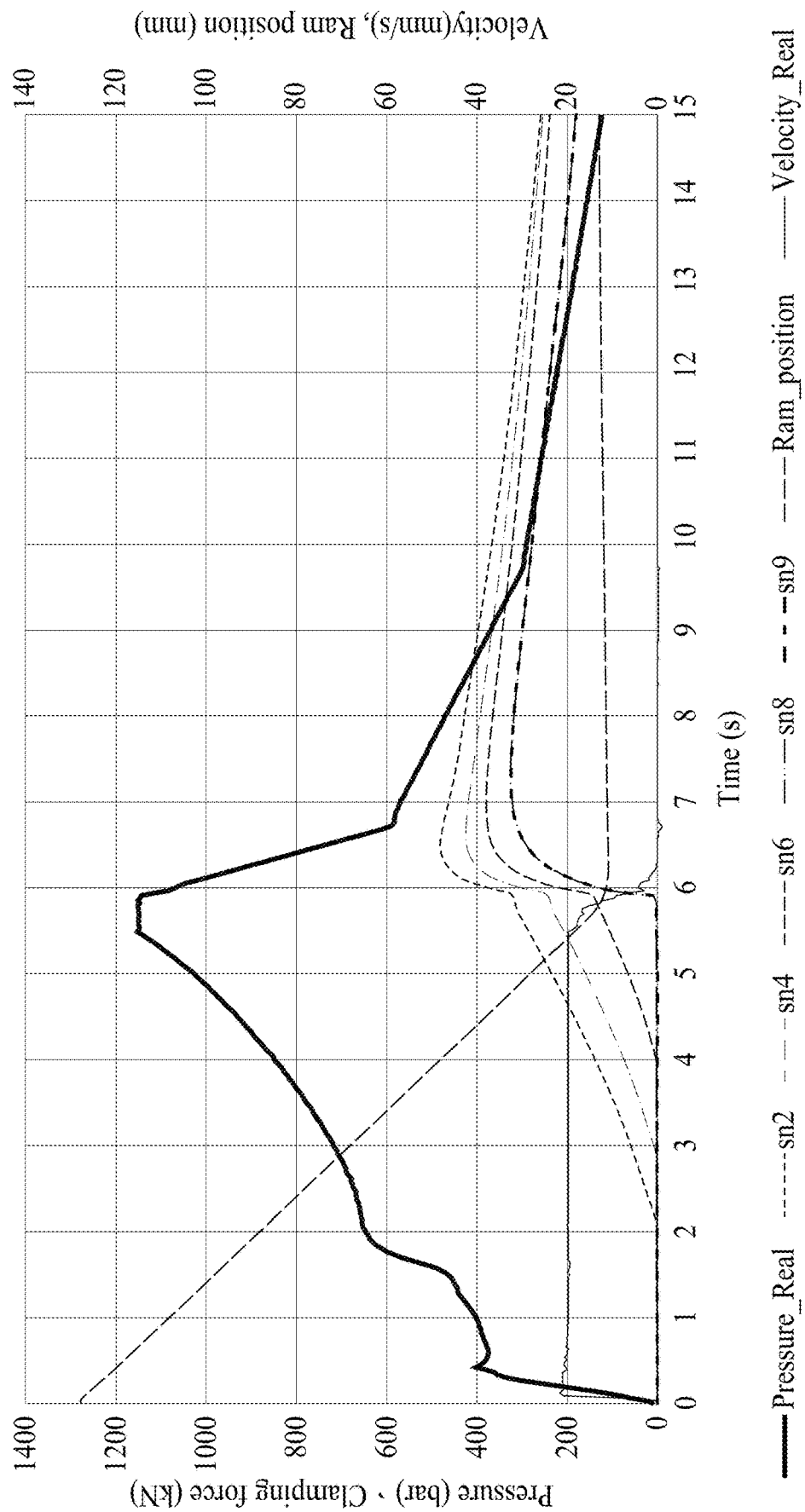
FIG. 20 shows a predetermined pressure profile, multiple pressure profiles, and a screw position profile obtained using an injection velocity of 20 mm/s and a V/P transfer point of 16.5 mm.
Figure 21:
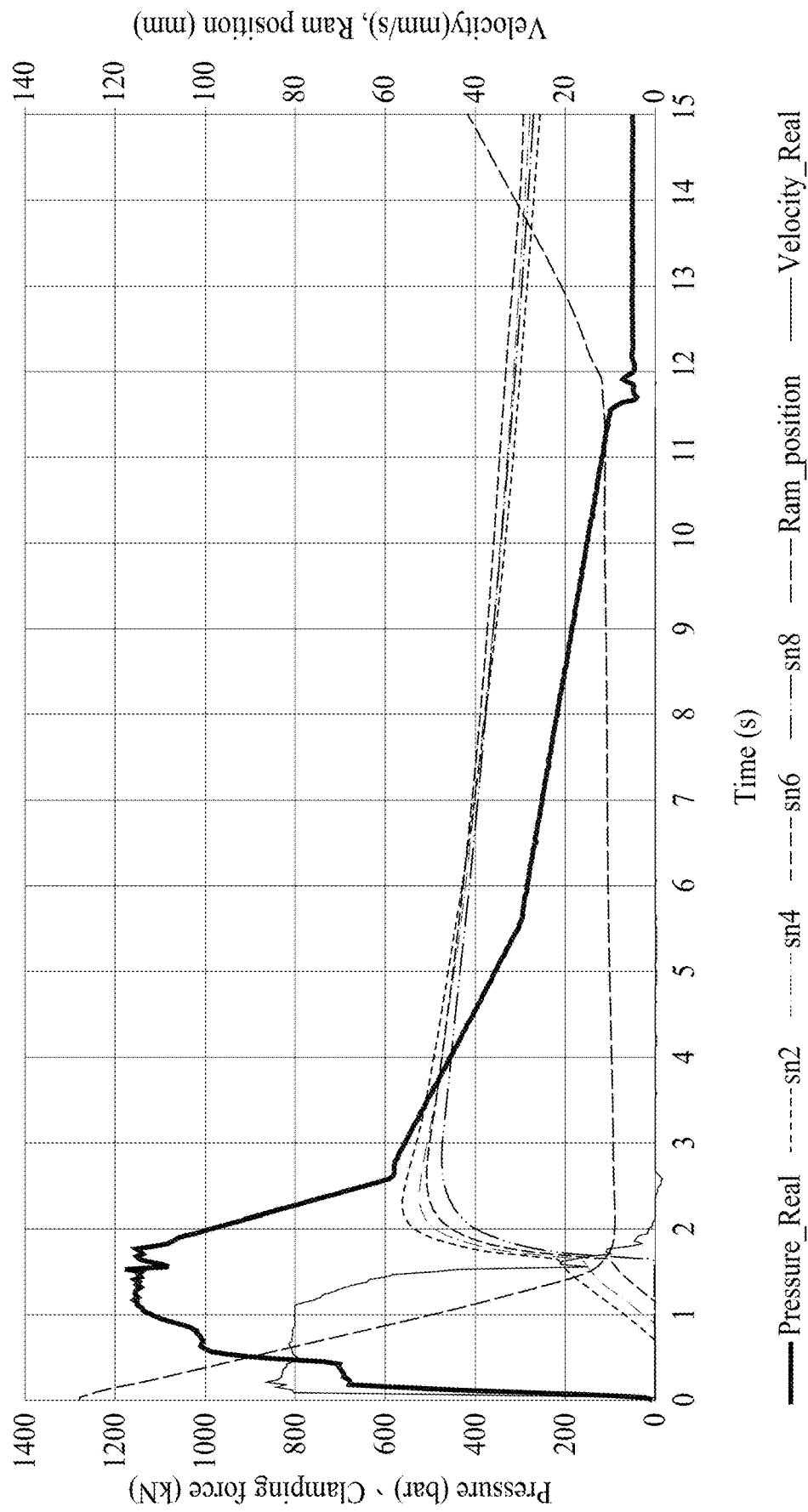
FIG. 21 shows a predetermined pressure profile, multiple pressure profiles, and a screw position profile obtained using an injection velocity of 80 mm/s and a V/P transfer point of 16.5 mm.
Figure 22:
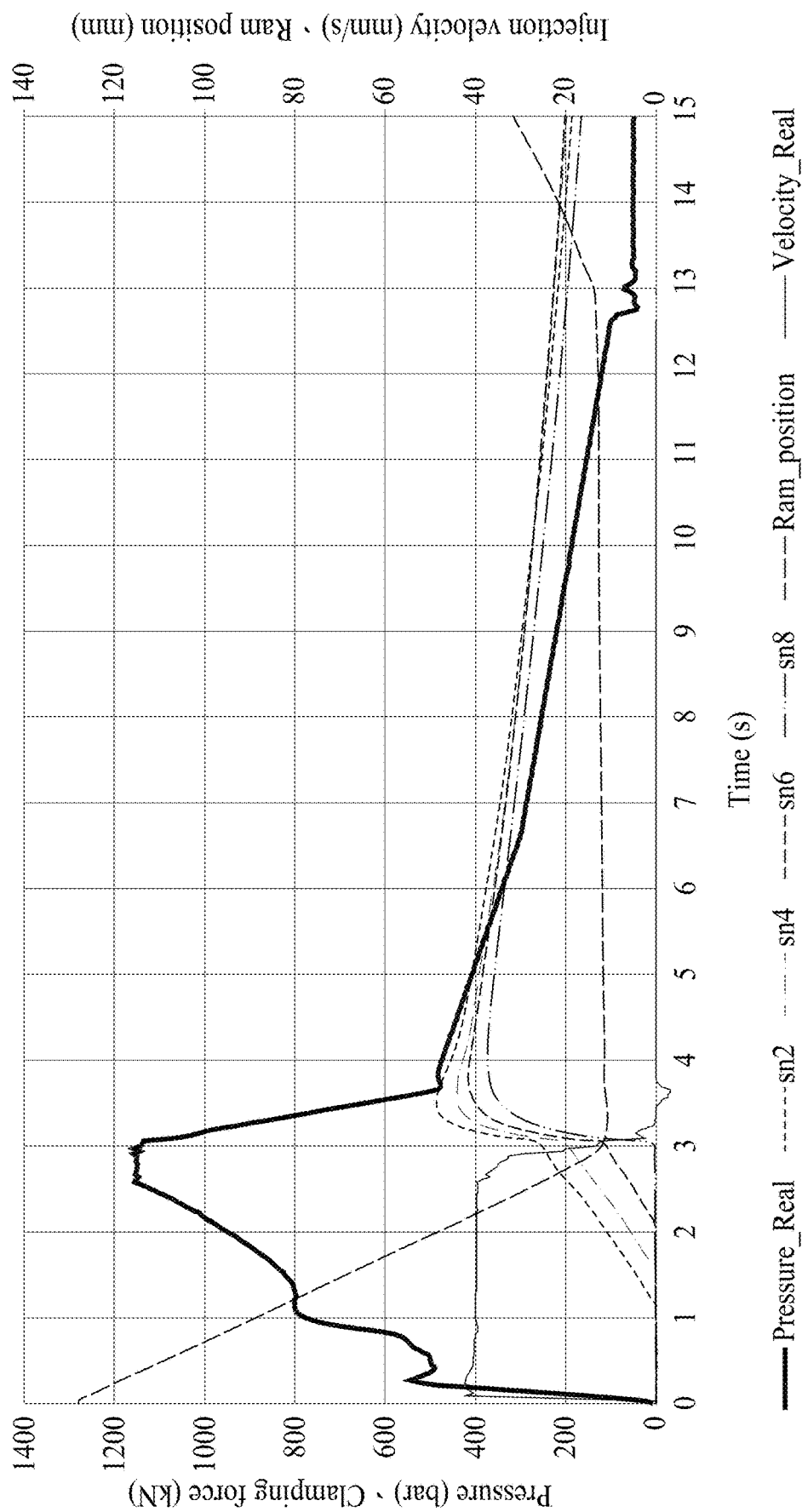
FIG. 22 shows a predetermined pressure profile, multiple pressure profiles, a screw position profile, and an injection profile obtained using an injection velocity of 40 mm/s and a V/P transfer point of 20 mm.
Figure 23:
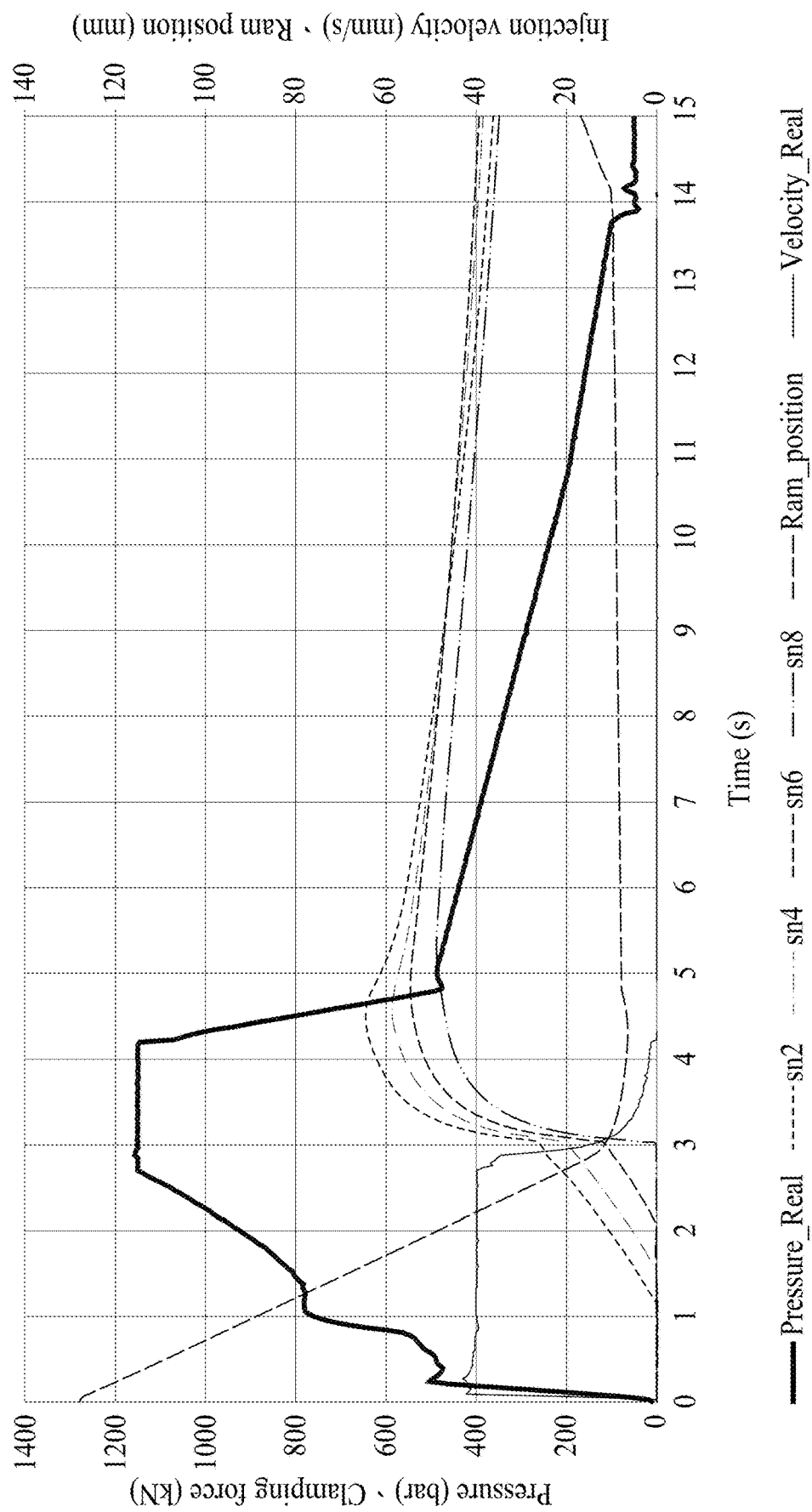
FIG. 23 shows a predetermined pressure profile, multiple pressure profiles, a screw position profile, and an injection profile obtained using an injection velocity of 40 mm/s and a V/P transfer point of 7 mm.

FIG. 20 shows a pressure profile (marked as "Pressure_Real"), multiple pressure profiles at different sites of the molding cavity 332 (marked as "sn2," "sn4," "sn6" and "sn8"), and a screw position profile (marked as "Ram_position") obtained using an injection velocity of the screw 230 (marked as "Velocity_Real") of 20 mm/s and a V/P point of 16.5 mm. FIG. 21 shows a pressure profile, multiple pressure profiles at different sites of the molding cavity 332, and a screw position profile obtained using an injection velocity of 80 mm/s and a V/P point of 16.5 mm. FIG. 22 shows a pressure profile, multiple pressure profiles at different sites of the molding cavity 332, a screw position profile, and an injection velocity of the screw 230 obtained by using an injection velocity of 40 mm/s and a V/P transfer point of 20 mm. FIG. 23 shows a pressure profile, multiple pressure profiles at different sites of the molding cavity 332, a screw position profile, and an injection velocity of the screw 230 obtained by using an injection velocity of 40 mm/s and a V/P transfer point of 7 mm. As can be seen in FIGS. 20 to 23, the deviations of the pressures at an endpoint of the packing stage are less than the target value (i.e., 50 bars). That is, by converging the pressures at different sites of the molding cavity 332 during the packing stage, the dimension of the molded product can be effectively adjusted while using an identical mold 30.

Table 2 lists a molded product produced using identical packing pressures during the packing stage (marked as "Original") and molded products produced using multiple packing pressures during the packing stage (marked as "Level 1," "Level 2" and "Level 3").

TABLE 2

| | Average Pressure (bar) | Range (bar) | weight (g) | Width (mm) | Length (mm) |
| --- | --- | --- | --- | --- | --- |
| Original | 328.5 | ±69.69 | 105.99 | 99.54 | 298.8 |
| Level 3 | 331.3 | ±21.57 | 106.55 | 99.59 | 298.84 |
| Level 2 | 303.02 | ±23.62 | 105.86 | 99.53 | 298.77 |
| Level 1 | 217.16 | ±23.84 | 104.15 | 99.5 | 298.63 |

Figure 24:
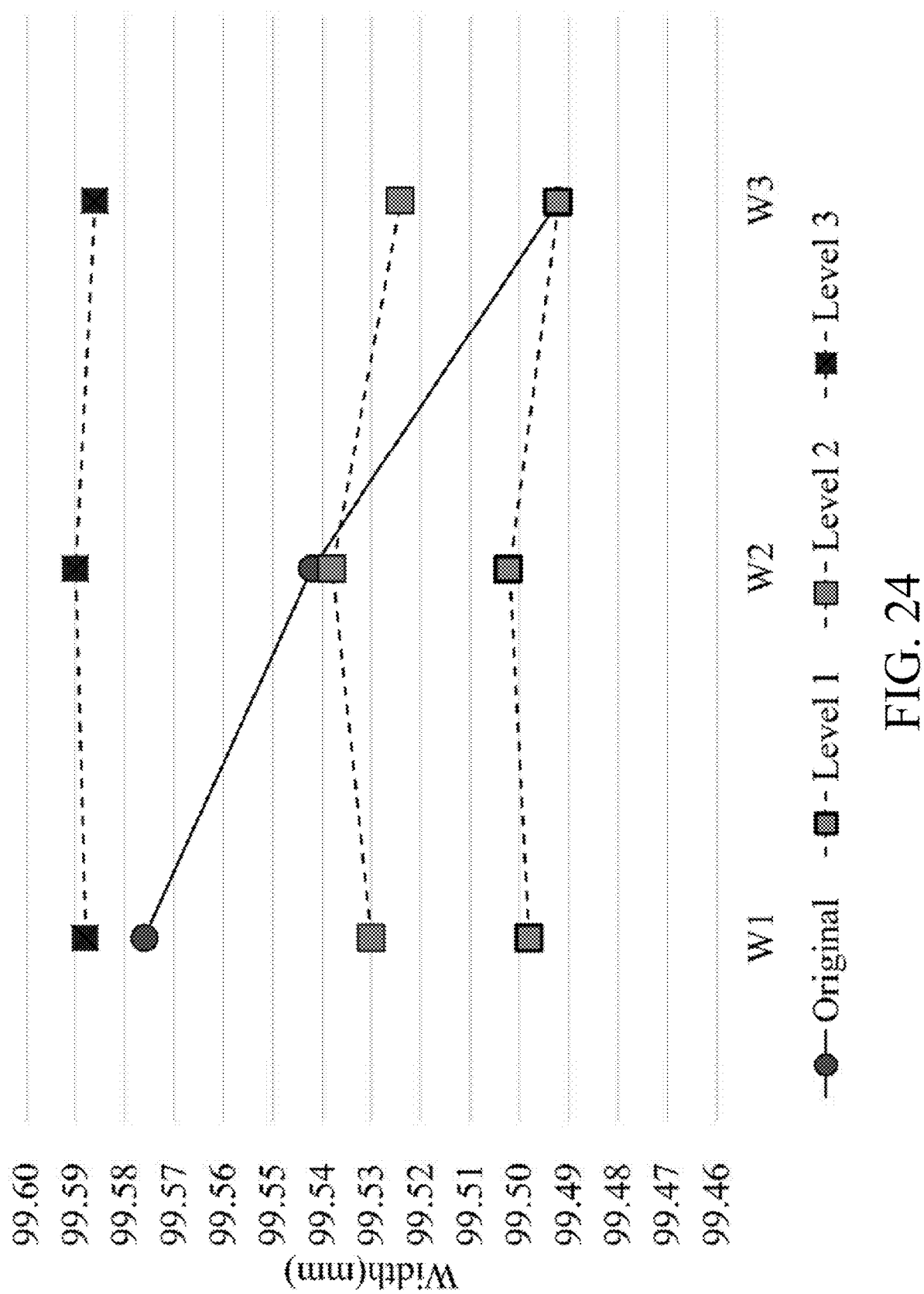
FIG. 24 is a chart showing widths of a molded product produced using identical packing pressures during the packing stage and widths of molded products produced using multiple packing pressures during the packing stage.

FIG. 24 is a chart showing widths of a molded product produced using identical packing pressures during the packing stage (marked as "Original") and widths of molded products produced using multiple packing pressures during the packing stage (marked as "Level 1," "Level 2" and "Level 3"), wherein the positions shown in in FIG. 18 are used for measuring the widths W1 to W3 shown in FIG. 24. As can be seen in FIG. 22, the molded products produced using multiple packing pressures during the packing stage can have a reduced shrinkage compared to that of the molded product formed using identical packing pressures.

One aspect of the present disclosure provides a method of producing a molded product. The method comprises steps of performing, via computer-assisted engineering simulation software, a first simulation process to generate a plurality of molding conditions comprising a default injection velocity profile and a default packing pressure profile; conducting, via an injection-molding apparatus, a trial molding to inject a molding material into a mold using the default molding conditions and sensing a plurality of in-mold pressures at different sites in a molding cavity of the mold; and conducting, via an injection-molding apparatus, an actual molding to produce the molded product using the default molding conditions if a deviation of the in-mold pressures at an endpoint of a packing stage is less than a target value.

One aspect of the present disclosure provides a method of adjusting a dimension of a molded product. The method comprises steps of generating a plurality of molding conditions; selecting one of the molding conditions to be updated for the adjusting of the dimension of the molded product; determining an average of the in-mold pressures at the endpoint of the packing stage based on an adjusted dimension of the molded product; and updating the selected molding condition based on the average of the in-mold pressures obtained at the endpoint of the packing stage.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods and steps.

What is claimed is:

1. A method of producing a molded product, comprising:

performing, via computer-assisted engineering simulation software, a first simulation process to generate a plurality of molding conditions comprising a default injection velocity profile and a default packing pressure profile;

conducting, via an injection-molding apparatus, a trial molding to inject a molding material into a mold using the molding conditions and then sensing a plurality of in-mold pressures at different sites in a mold cavity of the mold during the trial molding;

conducting, via the injection-molding apparatus, an actual molding to produce the molded product using the molding conditions that were used for conducting the trial molding if a deviation of the in-mold pressures at an endpoint of a packing stage during the trial molding is less than a target pressure value at the endpoint of the packing stage;

generating, via the injection-molding apparatus, at least one adjusted molding condition if the deviation of the in-mold pressures at the endpoint of the packing stage during the trial molding is not less than the target pressure value at the endpoint of the packing stage;

performing, via the computer-assisted engineering simulation software, a second simulation process to generate at least one simulated molding condition corresponding to the adjusted molding condition to ensure that the adjusted molding condition is qualified; and conducting, via the injection-molding apparatus, the actual molding to produce the molded product using the adjusted molding conditions if the adjusted molding condition is qualified.

2. The method of claim 1, wherein the performing of the first simulation process to generate the default molding conditions comprises:

specifying a simulation domain comprising a model;

performing a first virtual molding to determine a velocity-to-pressure transfer point;

performing a plurality of second virtual moldings using varying injection velocities and a default start filling point derived from the velocity-to-pressure transfer point to determine a default injection velocity;

performing a plurality of third virtual moldings using the default injection velocity, the default start filling point and varying packing times to determine a period of a packing stage;

determining an initial packing pressure profile for the use during the packing stage by limiting a maximum injection pressure and to thereby define the default injection velocity profile;

performing a fourth virtual molding using the default injection velocity profile, the default start filling point, the period of the packing stage, and the initial packing pressure profile to obtain pressures at an endpoint of the packing stage from different sensing nodes of the model; and determining the default packing pressure profile based on the initial packing pressure profile and a deviation of the pressures at the endpoint of the packing stage obtained from the sensing nodes.

3. The method of claim 2, wherein the first virtual molding is simulated to obtain a volume of the model, and the velocity-to-pressure transfer point occurs when the model is approximately full.

4. The method of claim 2, wherein the default injection velocity is selected from peak pressures generated from the second virtual moldings.

5. The method of claim 2, wherein during the simulation of the third virtual moldings, pressures at different sites of the model are obtained, and the period of the packing stage is determined based on the pressures obtained near a gate node of the model, wherein the gate node of the model in the simulation domain corresponds to a gate inside a mold of the injection-molding apparatus.

6. The method of claim 5, wherein the period of the packing stage is determined based on the pressures obtained at one of the sensing nodes on a plate connected to a columnar segment where the gate node is positioned, and the plate corresponds to a molding cavity inside the mold.

7. The method of claim 2, wherein the determining of the default packing pressure profile comprises:

generating an adjusted packing pressure profile in accordance with the initial packing pressure profile if the deviation of the pressures at the endpoint of the packing stage is not less than the target pressure value at the endpoint of the packing stage, wherein the adjusted packing pressure profile functions as the default packing pressure profile.

8. The method of claim 7, wherein the initial packing pressure profile functions as the default packing pressure profile for conducting the trial molding and the actual molding if the deviation of the obtained pressures is less than the target pressure value at the endpoint of the packing stage.

9. The method of claim 8, wherein the initial packing pressure profile comprises a constant pressure, and the adjusted packing pressure profile comprises varying pressures.

10. The method of claim 9, wherein the pressures in the adjusted packing pressure profile decrease over time.

11. The method of claim 10, wherein the adjusted packing pressure profile is represented by a sloped waveform.

12. The method of claim 10, wherein the adjusted packing pressure profile is represented by a stepped waveform.

13. The method of claim 9, wherein a maximum of the adjusted packing pressure profile is equal to the constant pressure of the initial packing pressure profile.

14. The method of claim 2, further comprising performing a fifth virtual molding to generate a plurality of simulated state waveforms if the deviation of pressures obtained at the endpoint of the packing stage is less than the target pressure value at the endpoint of the packing stage.

* * * * *